United States Patent
Lu et al.

(10) Patent No.: US 9,365,771 B2
(45) Date of Patent: *Jun. 14, 2016

(54) LIQUID CRYSTAL COMPOUNDS CONTAINING A DIFLUOROMETHYLENEOXY LINKING GROUP THAT HYDROGEN SUBSTITUTED BY DEUTERIUM, THEIR PREPARATION AND APPLICATION

(71) Applicant: Shijiazhuang Chengzhi Yonghua Display Materials Co., Ltd, Shijiazhuang, Hebei Providence (CN)

(72) Inventors: Wen Hai Lu, Shijiazhuang (CN); Ze Feng Hou, Shijiazhuang (CN); Xing Zhang, Shijiazhuang (CN); Guo Liang Yun, Shijiazhuang (CN); Rui Mao Hua, Shijiazhuang (CN); Jin Wang, Shijiazhuang (CN); Ya Jie Duan, Shijiazhuang (CN)

(73) Assignee: SHIJIAZHUANG CHENGZHI YONGHUA DISPLAY MATERIALS CO., LTD., Shijiazhuang, Hebei Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,398

(22) Filed: Jul. 3, 2014

(65) Prior Publication Data

US 2014/0312276 A1    Oct. 23, 2014

(30) Foreign Application Priority Data

Jan. 21, 2014 (CN) .......................... 2014 1 0027557

(51) Int. Cl.
| | |
|---|---|
| C09K 19/32 | (2006.01) |
| C09K 19/30 | (2006.01) |
| C09K 19/20 | (2006.01) |
| C09K 19/40 | (2006.01) |
| C09K 19/44 | (2006.01) |
| C09K 19/04 | (2006.01) |
| C09K 19/34 | (2006.01) |

(52) U.S. Cl.
CPC .......... *C09K 19/3068* (2013.01); *C09K 19/20* (2013.01); *C09K 19/3066* (2013.01); *C09K 19/321* (2013.01); *C09K 19/322* (2013.01); *C09K 19/402* (2013.01); *C09K 19/44* (2013.01); *C09K 2019/0466* (2013.01); *C09K 2019/301* (2013.01); *C09K 2019/3016* (2013.01); *C09K 2019/3078* (2013.01); *C09K 2019/3422* (2013.01)

(58) Field of Classification Search
CPC ................................... C09K 19/3068
USPC ................................... 252/299.63
See application file for complete search history.

(56) References Cited

FOREIGN PATENT DOCUMENTS

| | | |
|---|---|---|
| CN | 1717468 | 1/2006 |
| CN | 101143808 | 3/2008 |
| CN | 101157862 | 4/2008 |

*Primary Examiner* — Chanceity Robinson
(74) *Attorney, Agent, or Firm* — Muncy, Geissler, Olds & Lowe, P.C.

(57) ABSTRACT

This invention relates to liquid crystal compound of formula I containing a difluoromethyleneoxy linking group that hydrogen substituted by deuterium and therefore being very suitable for formulating a liquid crystal mixture. A liquid crystal mixture containing such type of liquid crystal compounds can be applied in various display devices.

Formula I

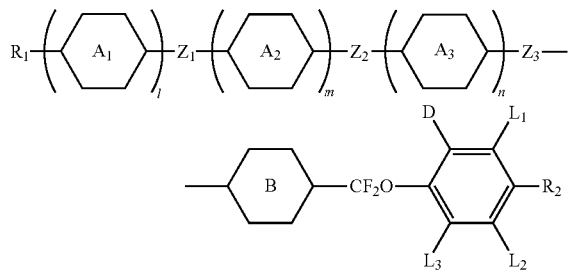

20 Claims, No Drawings

LIQUID CRYSTAL COMPOUNDS CONTAINING A DIFLUOROMETHYLENEOXY LINKING GROUP THAT HYDROGEN SUBSTITUTED BY DEUTERIUM, THEIR PREPARATION AND APPLICATION

TECHNICAL FIELD

This invention relates to the field of liquid crystal compounds and application, furthermore relates to liquid crystal compounds containing a difluoromethyleneoxy linking group that hydrogen substituted by deuterium, their preparation method and application.

TECHNICAL BACKGROUND

Currently the liquid crystal compounds are widely applied in various types of displays, electro-optical devices, sensors and the like. A large number of liquid crystal compounds used in display area, wherein the nematic liquid crystal is the most widely used. Nematic liquid crystals have been used in passive TN, STN matrix display and TFT active matrix system.

Although the technology of thin-film-transistor liquid-crystal display (TFT-LCD) has been mature, it should be continuously improved to decrease the response time, to widen the phase transition temperature, to decrease the driving voltage, and so on. It has been well-known that liquid crystals play an important role in improving the characteristics of LCDs.

The liquid crystal compounds are required to have high chemical and thermal stability, as well as high stability in electric field and electromagnetic radiation. The liquid crystal compounds used in TFT-LCD not only should be stable to heat, UV light, electric field, and electromagnetic radiation, but also have the wide temperature range of a nematic phase, appropriate optical anisotropy, very high resistance, high voltage holding ratio.

For dynamic picture display such as LCD-TV, in order to improve the characteristics of the device to reduce the picture motion blur and trailing, it is desired that the liquid crystal mixtures have appropriate physical properties with a short response time, a low rotational viscosity (γ1), and a low driving voltage. Also it is great significant to elevate the dielectric anisotropy (Δ∈) of the liquid crystal compound for the modulation of liquid crystal mixture.

It has been disclosed that the liquid crystal compounds containing difluoromethyleneoxy group ($-CF_2O-$) have low rotational viscosity. In addition, the presence of $-CF_2O-$ group and fluorine atoms in the molecules results in the increase of the dielectric anisotropy (Δ∈). Merck of Germany and Chisso of Japan have reported several liquid crystal compounds containing various substituents and difluoromethyleneoxy group ($-CF_2O-$) (CN1717468A, CN101143808A, CN101157862A). These compounds have good performance, but also have the disadvantage of low clearing point.

SUMMARY OF THE INVENTION

The object of the present invention is to provide a liquid crystal compound having a difluoromethyleneoxy bond ($-CF_2O-$) in which hydrogen substituted by deuterium, and its preparation method and application.

The liquid crystal compound of formula I can be applied as the liquid crystal composition to make a wide liquid crystalline mesophase and low viscosity.

This invention relates to liquid crystal compounds containing a difluoromethyleneoxy bond ($-CF_2O-$) in which hydrogen substituted by deuterium, the general structure as shown in formula I.

Formula I

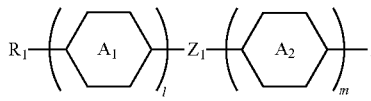
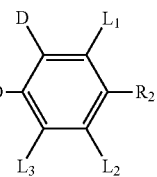

wherein, $R_1$, $R_2$ are H, Cl, F, CN, OCN, $OCF_3$, $CF_3$, $CHF_2$, $CH_2F$, $OCHF_2$, SCN, NCS, $SF_5$ or alkyl having 1 to 15 carbons, fluorinated alkyl having 1 to 15 carbons, chlorinated alkyl having 1 to 15 carbons, deuterated alkyl having 1 to 15 carbons, alkoxy having 1 to 15 carbons, fluorinated alkoxy having 1 to 15 carbons, chlorinated alkoxy having 1 to 15 carbons, deuterated alkoxy having 1 to 15 carbons, alkenyl having 2 to 15 carbons, fluorinated alkenyl having 2 to 15 carbons, chlorinated alkenyl having 2 to 15 carbons, deuterated alkenyl having 2 to 15 carbons, alkenoxy having 1 to 15 carbons, fluorinated alkenoxy having 1 to 15 carbons, chlorinated alkenoxy having 1 to 15 carbons, deuterated alkenoxy having 1 to 15 carbons, cyclopropane, cyclobutane, cyclopentane, cyclohexane, cycloheptane wherein one or more $-CH_2-$ independently of one another are replaced by $-CH=CH-$, $-C\equiv C-$, $-COO-$, $-OOC-$, $-O-$ or $-S-$;

Rings $A_1$, $A_2$ and $A_3$ independently of one another are:

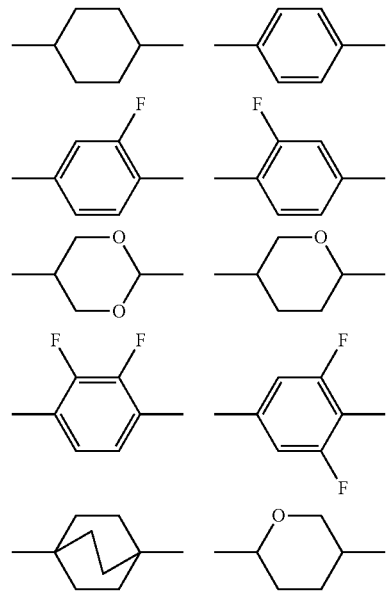

-continued

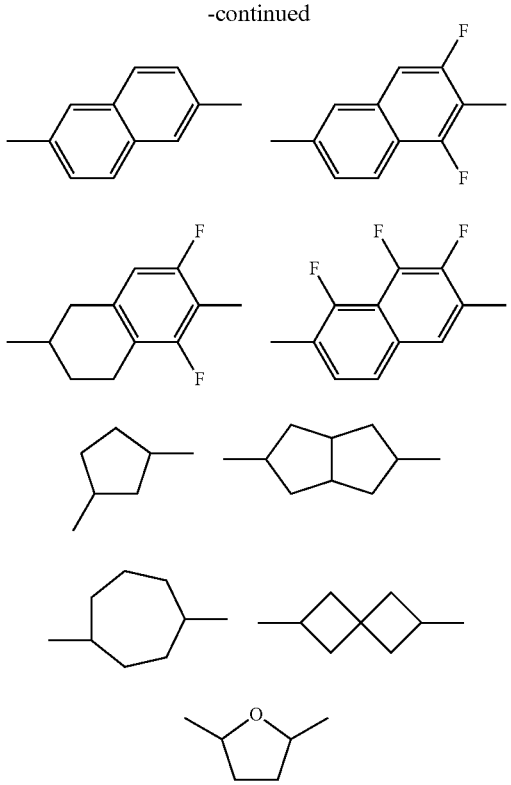

Ring B is:

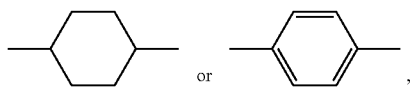

which may be monosubstituted or polysubstituted by fluorine, deuterium, chlorine;
l is 0, 1; m is 0, 1; n is 0, 1.
$Z_1$, $Z_2$ and $Z_3$ are —$CH_2$—, —$CH_2$—$CH_2$—, —$(CH_2)_3$—, —$(CH_2)_4$—, —CH=CH—, —C≡C—, —COO—, —OOC—, —$CF_2O$—, —$OCH_2$—, —$CH_2O$—, —$OCF_2$—, —$CF_2CH_2$—, —$CH_2CF_2$—, —$C_2F_4$—, —CF=CF— or single bond;
$L_1$, $L_2$ and $L_3$ are H, F, Cl or D.

Specifically, the formula I is formula Ia wherein, $R_1$ and $R_2$ are F, CN, $OCF_3$, $CF_3$, $CHF_2$, $CH_2F$, $OCHF_2$, NCS, $SF_5$ or alkyl having 1 to 7 carbons, alkoxy having 1 to 7 carbons, alkenyl having 2 to 8 carbons, alkenoxy having 2 to 8 carbons, cyclobutane, cyclopentane, cyclohexane, cycloheptane; Rings $A_1$, $A_2$ and $A_3$ independently of one another are:

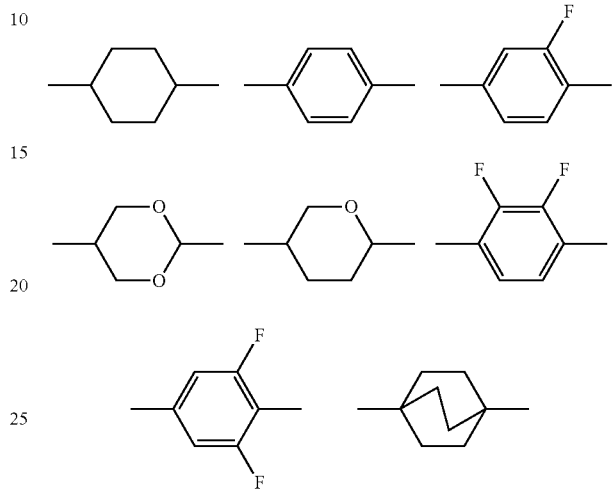

Ring B is:

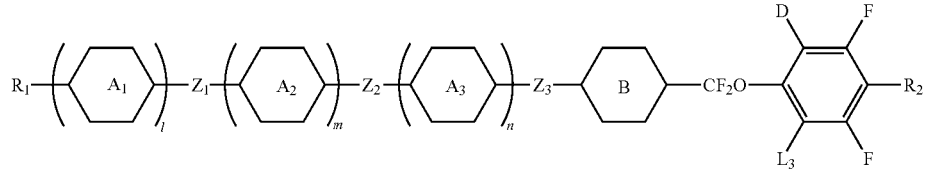

$Z_1$, $Z_2$ and $Z_3$ are —$CH_2$—$CH_2$—, —$(CH_2)_4$—, —CH=CH—, —C≡C—, —COO—, —OOC—, —$OCH_2$—, —$CH_2O$—, —$OCF_2$—, —$CF_2CH_2$—, —$CH_2CF_2$—, —$C_2F_4$—, —CF=CF— or single bond;
$L_3$ is H or D.
l is 0, 1; m is 0, 1; n is 0, 1.

The compounds of the formula I are preferred selected from formula I-1 to formula I-3.

formula Ia

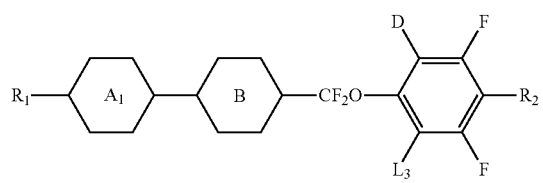

I-1

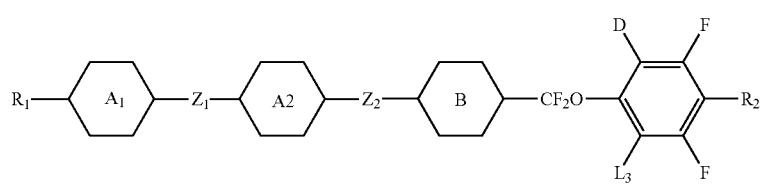

I-2

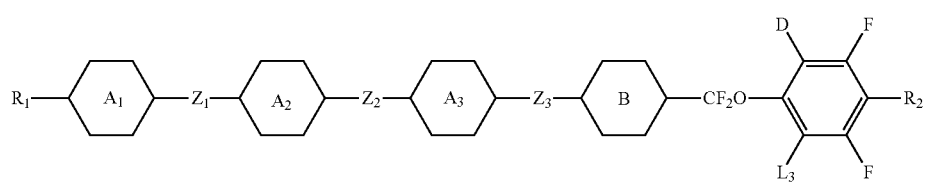

I-3 wherein, $R_1$ is alkyl having 1 to 7 carbons, alkoxy having 1 to 7 carbons, alkenyl having 2 to 8 carbons, alkenoxy having 2 to 8 carbons, cyclobutane, cyclopentane, cyclohexane or cycloheptane;

$R_2$ is F, CN, $OCF_3$, $CF_3$, $CHF_2$, $CH_2F$, $OCHF_2$, NCS, $SF_5$ or alkyl having 1 to 7 carbons, alkoxy having 1 to 7 carbons, alkenyl having 2 to 8 carbons, alkenoxy having 2 to 8 carbons, cyclobutane, cyclopentane, cyclohexane, cycloheptane;

Rings $A_1$, $A_2$ and $A_3$ independently of one another are:

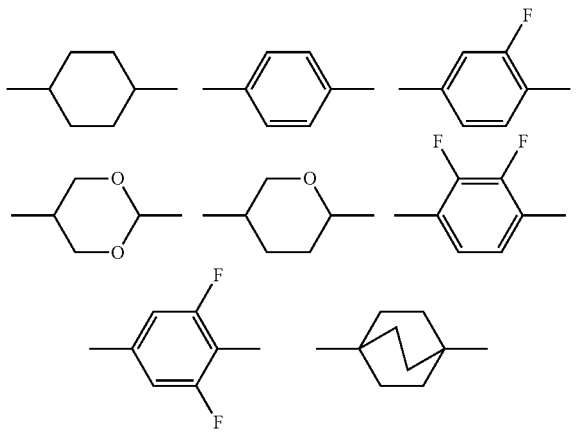

Ring B is:

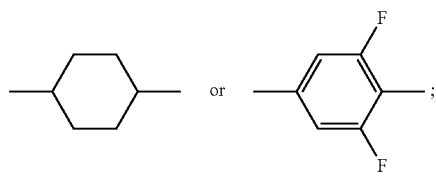

$Z_1$, $Z_2$ and $Z_3$ are —$CH_2$—$CH_2$—, —$(CH_2)_4$—, —CH=CH—, —C≡C—, —COO—, —OOC—, —$OCH_2$—, —$CH_2O$—, —$OCF_2$—, —$CF_2CH_2$—, —$CH_2CF_2$—, —$C_2F_4$—, —CF=CF— or single bond;

$L_3$ is H or D.

This invention relates to compounds, their general structural formula shown in formula II.

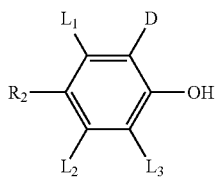

formula II

In which $R_2$, L1, L2 and L3 are as defined in formula I compound of formula II can be synthesized by the following scheme.

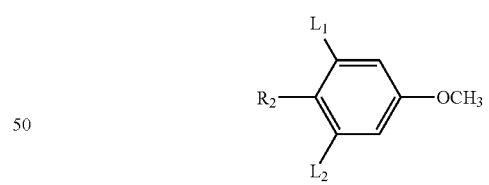

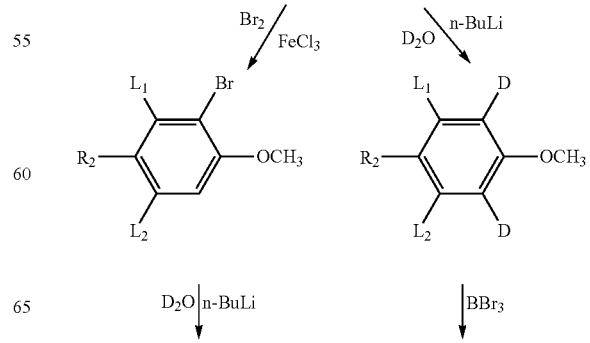

-continued

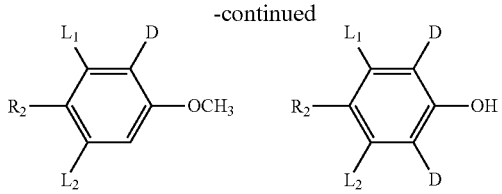

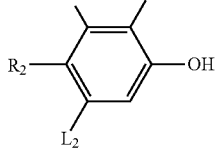

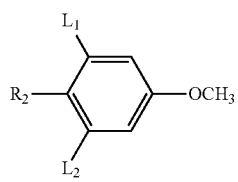

have reaction with Bromine and ferric chloride in 10-20° C. for 6 h,

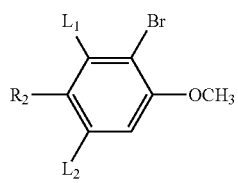

was obtained.
The molar ratio of

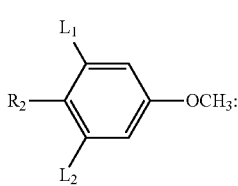

Bromine:ferric chloride is 1:0.9~1.2:0.005~0.03, preferably is 1:1.1:0.012; reaction time is 1~12 hours, preferably is 6 hours; reaction temperature is 0~30° C., preferably is 10~20° C.

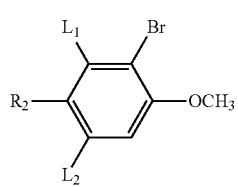

have reaction with n-butyllithium solution and heavy water in −78° C.,

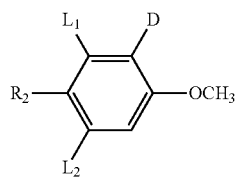

was obtained.
The molar ratio of

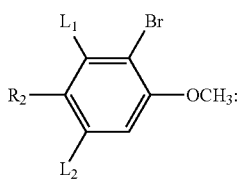

n-butyllithium solution:heavy water is 1:0.9~1.2:1~10, preferably is 1:1:2; reaction temperature is −60~−90° C., preferably is −78° C.

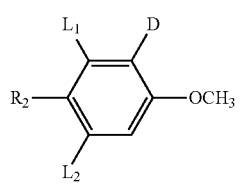

have reaction with tribromide in 0° C. for 12 h,

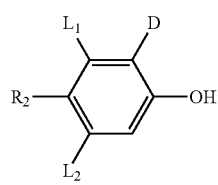

was obtained.
The molar ratio of

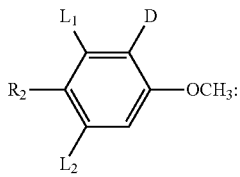

tribromide is 1:1~4, preferably is 1:2; reaction time is 1~48 hours, preferably is 12 hours; reaction temperature is −10~30° C., preferably is 20° C.

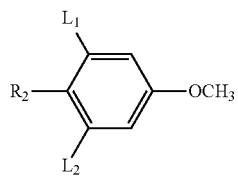

have reaction with n-butyllithium solution and heavy water in −78° C.,

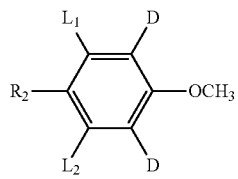

was obtained.
the molar ratio of

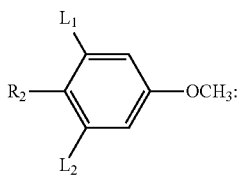

n-butyllithium solution:heavy water is 1:1.8~3:2~10, preferably is 1:2.2:3; reaction temperature is −60~−90° C., preferably is −78° C.

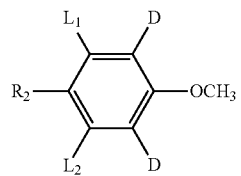

have reaction with tribromide in 0° C. for 12 h,

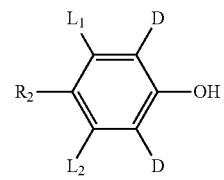

was obtained.
The molar ratio of

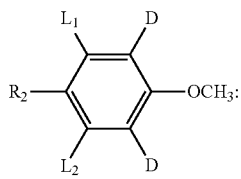

tribromide is 1:1~4, preferably is 1:2; reaction time is 1~48 hours, preferably is 12 hours; reaction temperature is −10~30° C., preferably is 20° C.

Liquid crystal compound of formula I can be synthesized by the following scheme.

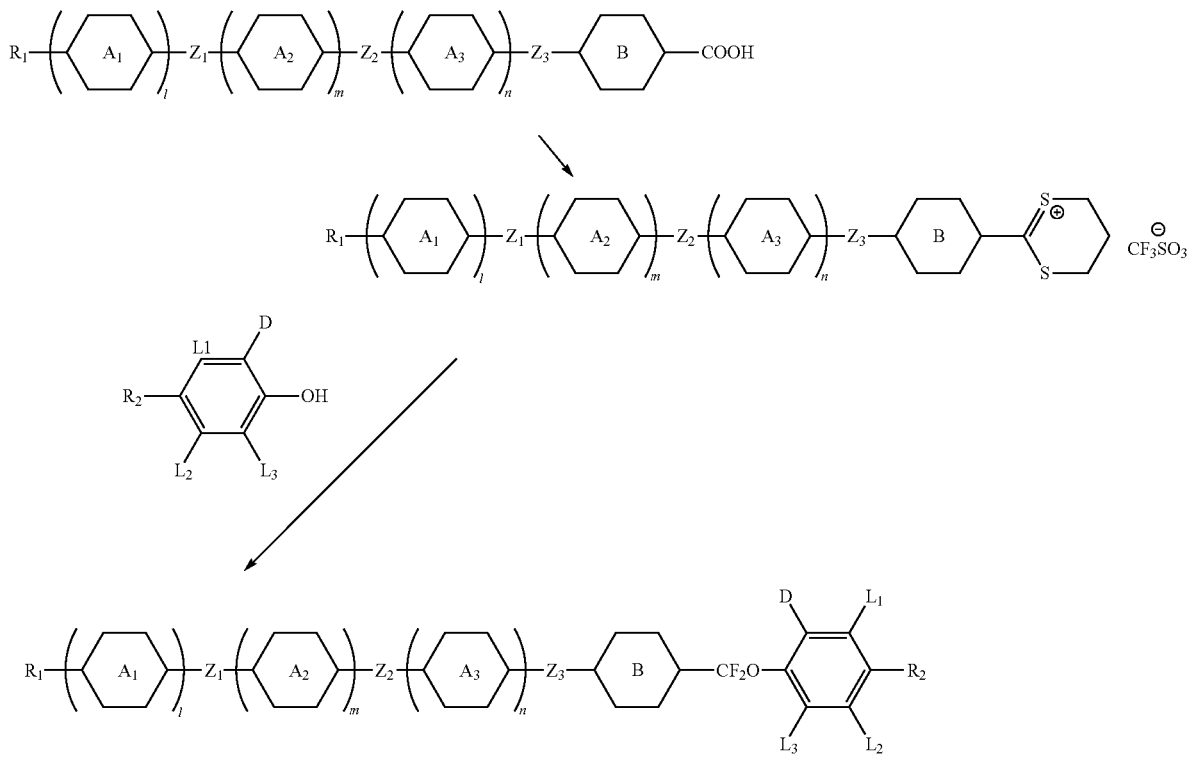

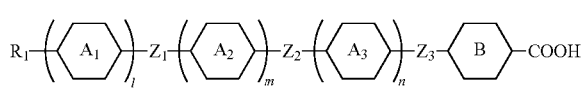

have reaction with 1,3-propanedithiol and trifluoromethanesulfonate refluxing for 6 h,

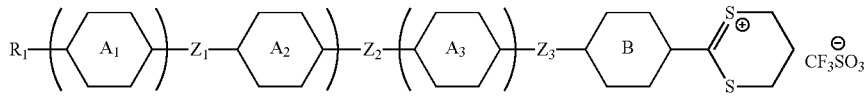

was obtained. Then

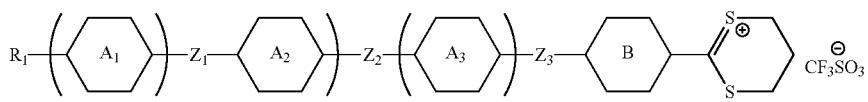

have reaction with

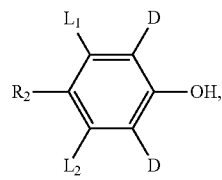

triethylamine, Triethylamine trihydrofluoride and bromine in −78° C.,

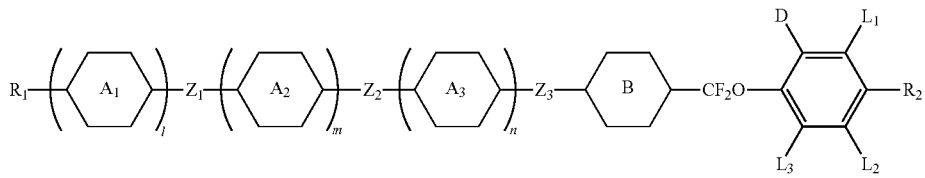

was obtained.

The molar ratio of

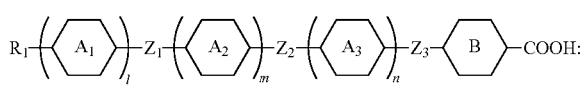

1,3-propanedithiol:trifluoromethanesulfonate:

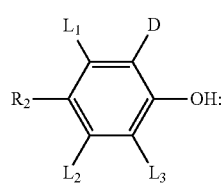

triethylamine: triethylamine trihydrofluoride:bromine is 1:1~2:1~2:0.8~1.2:1~2:1~5:1~5, preferably is 1:1.3:1.3:1.1:1.3:3:3; reaction temperature is −60~−90° C., preferably is −78° C.

A liquid-crystal mixture comprises component a, wherein said component a comprises at least one compound selected from compounds of formula I.

A liquid crystal mixture characterized in which the mass ratio of component a is 1~80%, preferred 13~21%.

A liquid crystal mixture characterized in which the liquid crystal mixture further comprises component b, component c, component d, component e and component f;

Therein the component b comprises one or more compounds selected from the following formula III, wherein the liquid crystal mixture, the mass ratio of component b is 1~70%, preferred 32~57%.

The component c comprises one or more compounds selected from the following formula IV. Wherein the liquid crystal mixture, the mass ratio of component c is 1~70%, preferred 6~24%.

The component d comprises one or more compounds selected from the following formula V. Wherein the liquid crystal mixture, the mass ratio of component d, is 1~30%, preferred 3~8%.

The component e comprises one or more compounds selected from the following formula VI. Wherein the liquid crystal mixture, the mass ratio of component e, is 1~30%, preferred 4~9%.

The component f comprises one or more compounds selected from the following formula VII. Wherein the liquid crystal mixture, the mass ratio of component f, is 1~50%, preferred 11~16%.

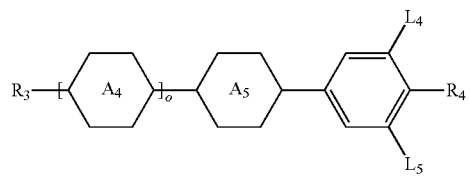

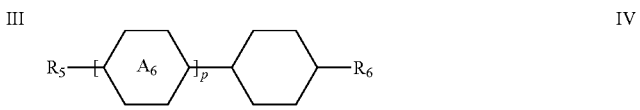

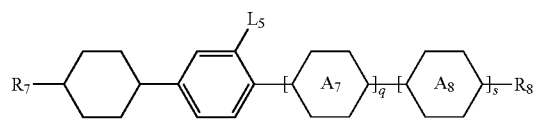

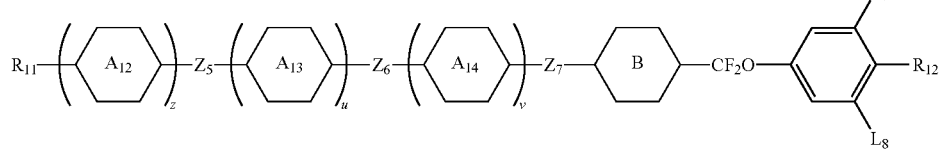

Formula III to VII, wherein $R_3$-$R_{12}$ are F, CN, OCF$_3$, CF$_3$, CHF$_2$, CH$_2$F, OCHF$_2$, NCS, SF$_5$ or alkyl having 1 to 7 carbons, alkoxy having 1 to 7 carbons, alkenyl having 2 to 8 carbons, alkenoxy having 2 to 8 carbons, cyclobutane, cyclopentane, cyclohexane, cycloheptane;

Rings $A_4$-$A_{14}$ independently of one another are:

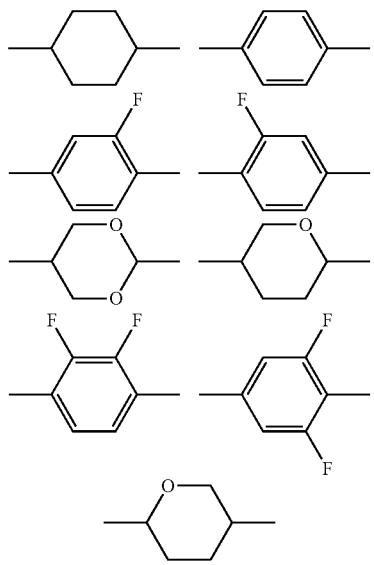

Ring B is:

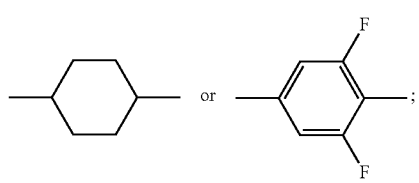

$Z_4$—$Z_7$ are —CH$_2$—CH$_2$—, —(CH$_2$)$_4$—, —CH═CH—, —C≡C—, —COO—, —OOC—, —OCH$_2$—, —CH$_2$O—, —OCF$_2$—, —CF$_2$CH$_2$—, —CH$_2$CF$_2$—, —C$_2$F$_4$—, —CF═CF— or single bond;

$L_4$-$L_8$ are H, F, Cl or CN;

o, p, q, s, x, y, z, u and v are 0, 1 or 2.

A compound characterized in that the formula III is preferred selected from formula III-1 to III-13.

III-1

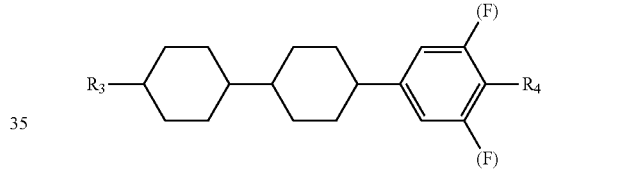

III-2

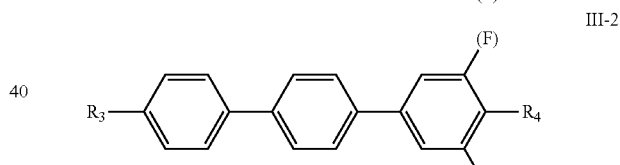

III-3

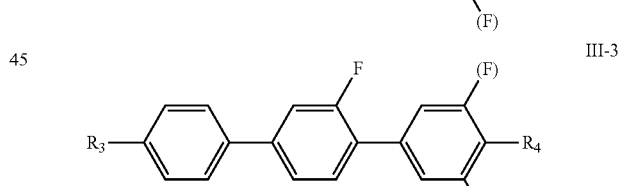

III-4

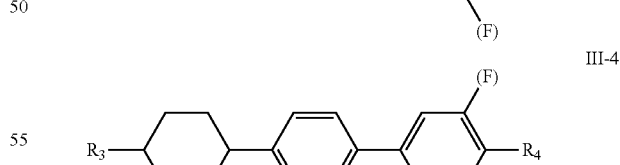

III-5

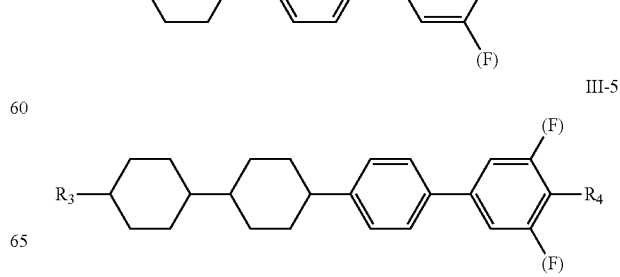

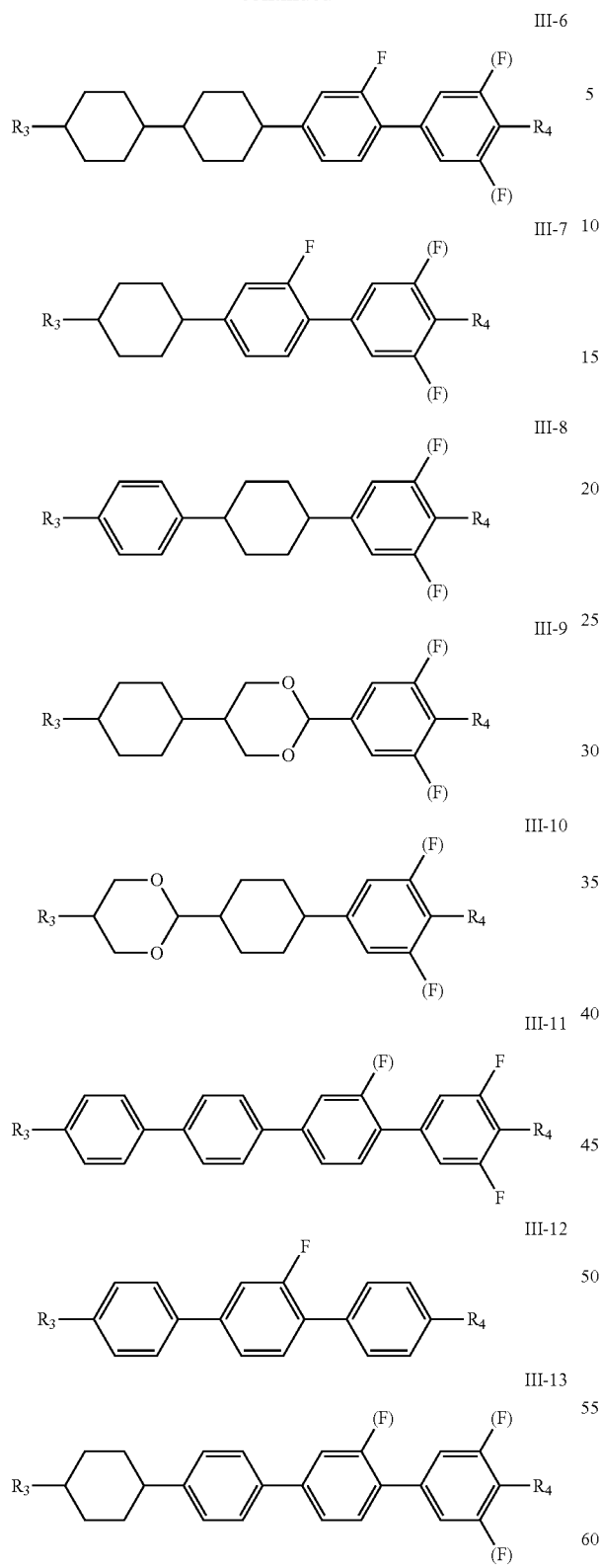
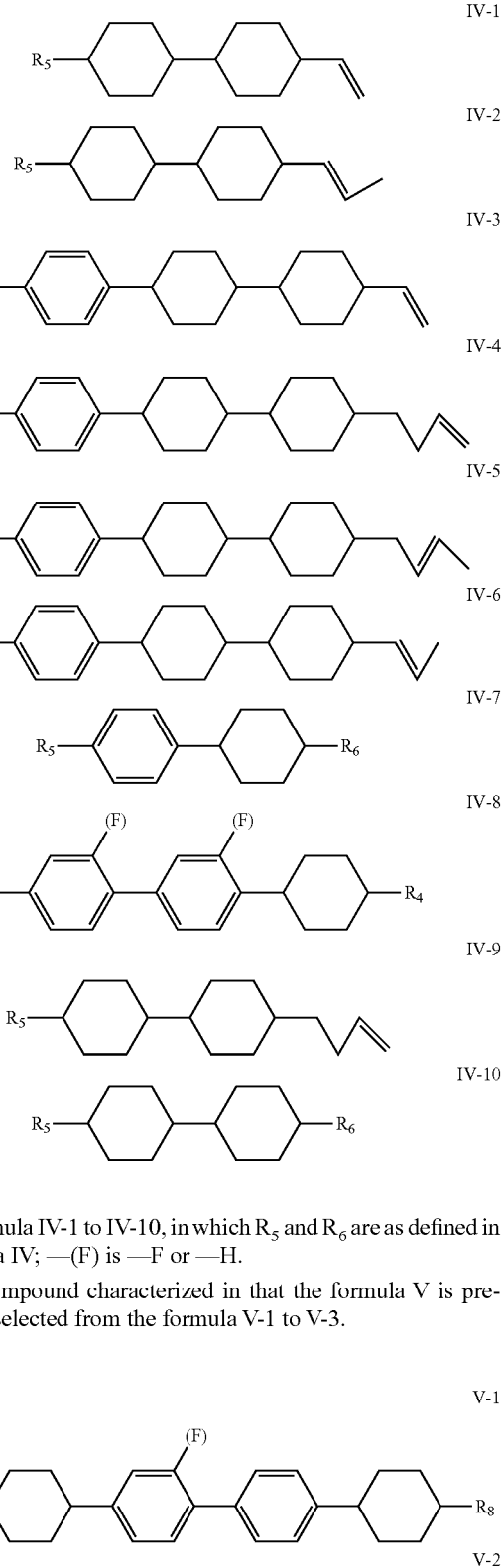
Formula III-1 to III-13, in which $R_3$ and $R_4$ are as defined in formula III; —(F) is —F or —H.
A compound characterized in that the formula IV is preferred selected from the formula IV-1 to IV-10.
Formula IV-1 to IV-10, in which $R_5$ and $R_6$ are as defined in formula IV; —(F) is —F or —H.
A compound characterized in that the formula V is preferred selected from the formula V-1 to V-3.

V-3

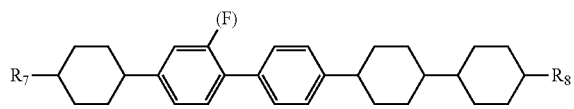

Formula V-1 to V-3, in which $R_7$ and $R_8$ are as defined in formula V; —(F) is —F or —H.

A compound characterized in that the formula VI is preferred selected from the formula VI-1 to VI-17

VI-1

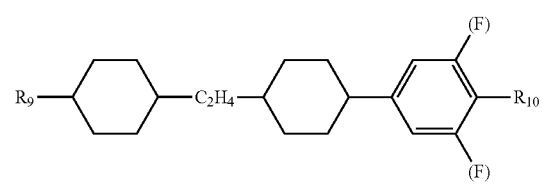

VI-2

VI-3

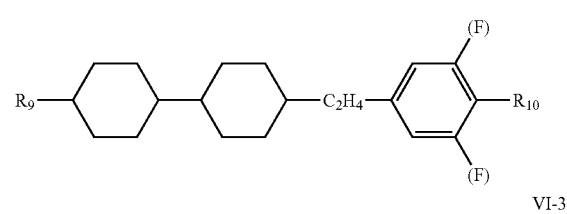

VI-4

VI-5

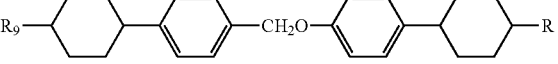

VI-6

VI-7

VI-8

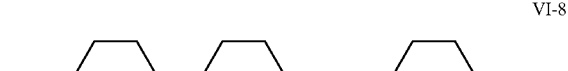

VI-9

VI-10

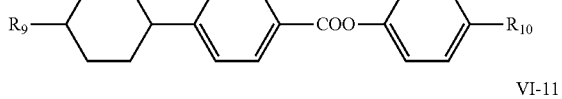

VI-11

VI-12

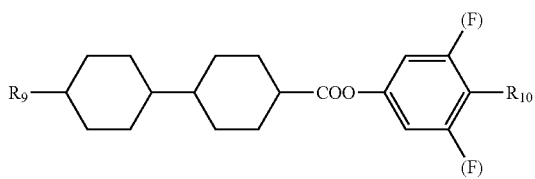

VI-13

VI-14

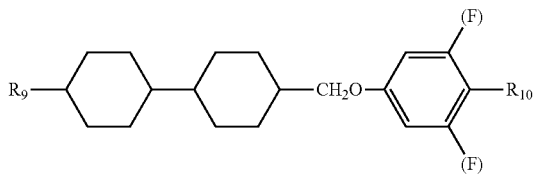

VI-15

VI-16

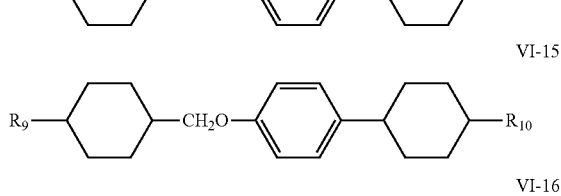

VI-17

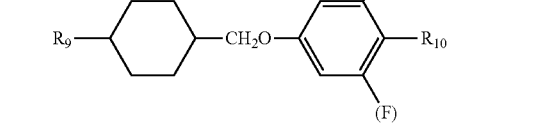

Formula VI-1 to VI-17, in which $R_9$ and $R_{10}$ are as defined in formula VI; —(F) is —F or —H A compound characterized in that the formula VII is preferred selected from the formula VII-1 to VII-8.

VII-1

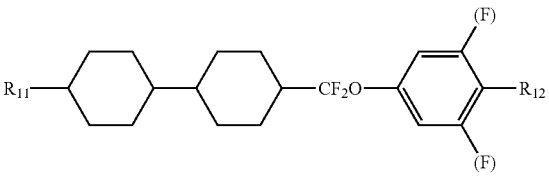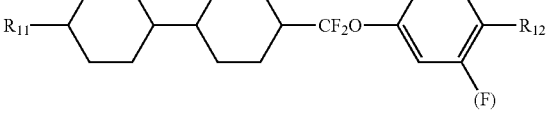

-continued

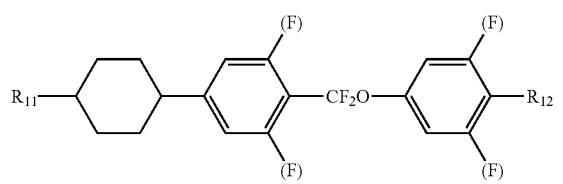
VII-2

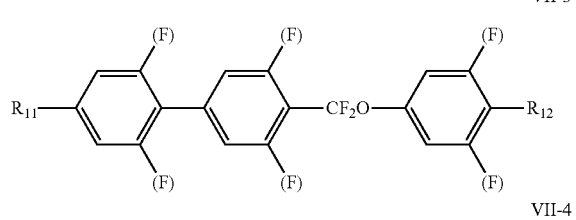
VII-3

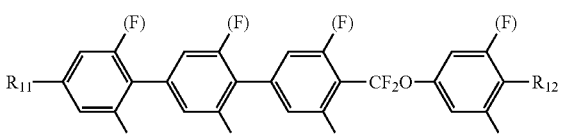
VII-4

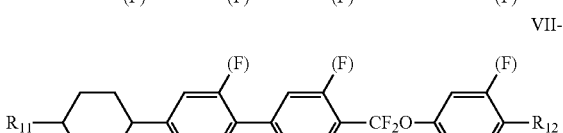
VII-5

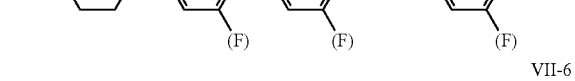
VII-6

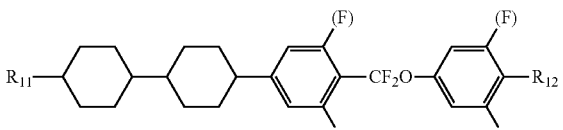
VII-7

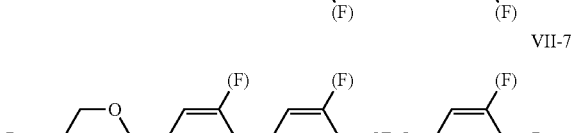
VII-8

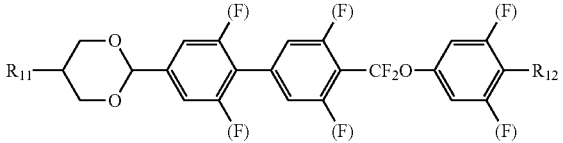

Formula VII-1 to VII-8, in which $R_{11}$ and $R_{12}$ are as defined in formula VII; —(F) is —F or —H.

Wherein the liquid crystal mixture, the mass ratio of component b, component c, component d, component e and component f is 1~70:1~70:1~30:1~30:1~50, preferred 32~57:6~24:3~8:4~9:11~16.

Specifically, the liquid crystal mixture consists of component a-f, the mass ratio of component a, component b, component c, component d, component e and component f is 1~80:1~70:1~70:1~30:1~30:1~50, preferred 13~21:32~57:6~24:3~8:4~9:11~16.

An electro-optical liquid crystal display device containing the liquid crystal mixture is within the invention.

The liquid crystal displays characterized in that the display modes are TN, STN, IPS or VA.

The liquid crystal compound of formula I can be synthesized by the following scheme.

THE EXAMPLES OF THE PRESENT INVENTION

The following examples illustrate the present invention without limiting it in any way. Wherein GC is gas chromatography purity, HPLC is HPLC purity, MP is melting point, CP is clearing point, MS is mass spectrometry, $^1$H-NMR is nuclear magnetic resonance spectrum, $\Delta\varepsilon$ is dielectric anisotropy, $\Delta n$ is Optical anisotropy, $V_{th}$ is threshold voltage. The detected temperature is 25° C.

Example 1

Preparation of the Compound of Formula I-1-1

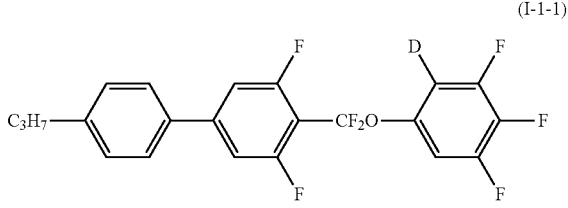
(I-1-1)

Step 1

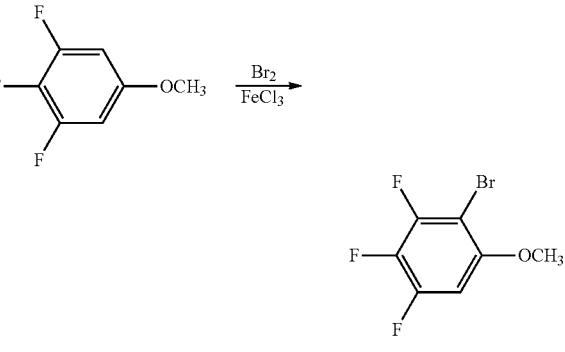

I-1-a 162 g (1 mol) of 3,4,5-trifluoromethoxybenzene, 2 g ferric chloride, 25 mL of acetic acid and 450 mL dichloromethane were added into a flask, stirred to dissolve the solids under $N_2$, in 10-20° C. then 176 g (1.1 mol) of Bromine was added dropwise in 2 hours. After additional 6 hours of stirring in 10-20° C., the reaction mixture was then poured into a solution of Saturated sodium bicarbonate solution (500 mL) with stirring. After conventional processing, 236 g pale yellow liquid (I-1-a) was obtain, its GC purity is 98.2%, its yield is 98%.

The molar ratio of 3,4,5-trifluoromethoxybenzene:Bromine:ferric chloride is 1:0.9~1.2:0.005~0.03, preferably is 1:1.1:0.012; reaction time is 1~12 hours, preferably is 6 hours; reaction temperature is 0~30, preferably is 10~20° C.

Step 2

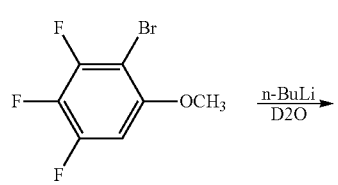

I-1-a

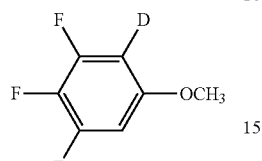

I-1-b 121 g (0.5 mol) of I-1-a and 500 mL of tetrahydrofuran were added into a flask, stirred to dissolve the solids under N₂, cooled to −80° C., then 204 mL of n-butyllithium solution (0.5 mol) was added dropwise in 1 hour. After additional 0.5 h of stirring, 40 g (2 mol) of heavy water was added dropwise at −80° C. in 0.5 h. After conventional processing, 84 g colorless liquid (I-1-b) was obtain. its GC purity is 99%, its yield is 96%.

the molar ratio of I-1-a:n-butyllithium solution:heavy water is 1:0.9~1.2:1~10, preferably is 1:1:2; reaction temperature is −60~−90° C., preferably is −78° C.

Step 3

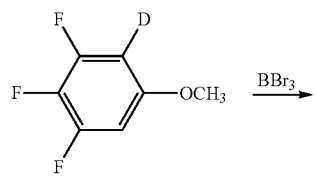

I-1-b

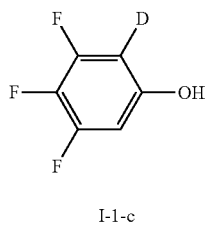

I-1-c 81 g (0.5 mol) of I-1-b and 1.5 L of dichloromethane were added into a flask, stirred to dissolve the solids under N₂, cooled to 0° C., then 248 g of Boron tribromide (1 mol) was added dropwise in 1 hour, and the solid was precipitated during the addition. After additional 12 hours of stirring, the reaction mixture was then poured into 1 L water with stirring. After conventional processing, 75 g colorless liquid (I-1-b) was obtain, its GC purity is 95%, its yield is 95%.

The molar ratio of I-1-b:tribromide is 1:1~4, preferably is 1:2; reaction time is 1~48 hours, preferably is 12 hours; reaction temperature is −10~30° C., preferably is 20° C.

Step 4

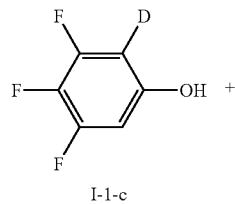

I-1-c

-continued

I-1-d

I-1-1

27.6 g (0.1 mol) of I-1-d, 14 g 1,3-propanedithiol (0.13 mol) and 200 mL toluene were added into a flask, stirred and heating to 40° C., then 19.5 g of trifluoromethanesulfonate (0.13 mol) was added in. The obtained mixture was refluxed for 6 hours until the dehydration reaction was completely, and the solvent was then evaporated. The obtained substance was adding 50 mL dichloromethane as spare 16.4 g (0.11 mol) of I-1-c, 13.2 g triethylamine (0.13 mol) and 200 mL dichloromethane were added into a flask, stirred and heating to 40° C., then 19.5 g of trifluoromethanesulfonate (0.13 mol) was added in, stirred to dissolve the solids under N₂, cooled to −78° C., then the spare was added dropwise in 0.5 h. After additional 0.5 h of stirring, 48 g (0.3 mol) of Triethylamine trihydrofluoride was added dropwise at −78° C. in 0.5 h, then 48 g bromine (0.3 mol) was added dropwise at −78° C. in 0.5 h. After conventional processing, 35 g colorless liquid (I-1-1) was obtain, its GC purity is 99.6%, its yield is 80%.

The molar ratio of I-1-d:1,3-propanedithiol:trifluoromethanesulfonate:I-1-c:triethylamine:triethylamine trihydrofluoride:bromine is 1:1~2:1~2:0.8~1.2:1~2:1~5:1~5, preferably is 1:1.3:1.3:1.1:1.3:3:3; reaction temperature is −60~−90° C., preferably is −78° C.

MS: m/z (%) 429 (M+, 0.6), 281 (100), 252 (28.0)

1H NMR (301 MHz, CHLOROFORM-D) δ 7.49 (d, J=7.8 Hz, 2H), 7.30 (d, J=7.3 Hz, 2H), 7.21 (d, J=11.0 Hz, 2H), 7.11-6.86 (m, 1H), 2.66 (t, J=7.6 Hz, 2H), 1.81-1.58 (m, 2H), 0.99 (td, J=7.3, 2.1 Hz, 3H).

On the basis of the above data, the structure of the obtained product is the expected compound I-1-1 mp 45.1° C.

cp 108.9° C.

Δn [589 nm, 20° C.]: 0.1262

Δε [1 KHz, 20° C.]: 20.04

From the above parameter, I-1-1 have excellent performance as the compounds of structure similar to the same properties of the non-deuterated monomers, Mixed crystal can effectively increase the number of use of such monomers to improve its solubility and low temperature performance.

The compounds shown below can be synthesized by a method similar to that described above using the corresponding reactants.

| | | |
|---|---|---|
| 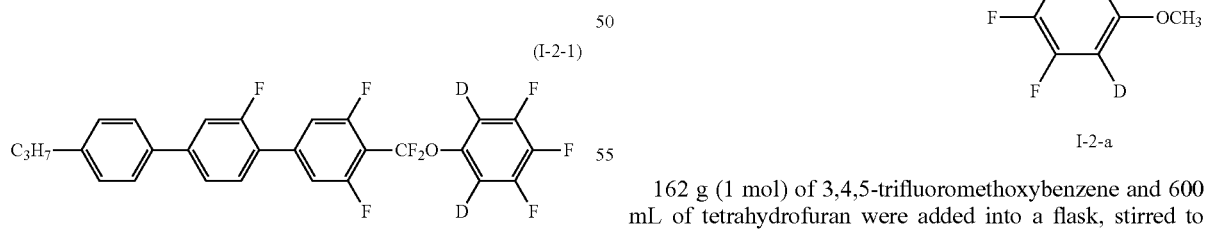 (structures) | Mp: 42.2° C.<br>Δn: 0.0732 | Cp: 105.3° C.<br>Δε: 10.24 |
| | Mp: 84.4° C.<br>Δn: 0.2132 | Cp: 127.8° C.<br>Δε: 25.94 |
| | Mp: 76.4° C.<br>Δn: 0.2032 | Cp: 117.6° C.<br>Δε: 23.94 |
| | Mp: 62.6° C.<br>Δn: 0.2223 | Cp: 121.8° C.<br>Δε: 25.32 |
| | Mp: 74.2° C.<br>Δn: 0.1558 | Cp: 93.7° C.<br>Δε: 28.32 |
| | Mp: 89.0° C.<br>Δn: 0.1557 | Cp: 119.2° C.<br>Δε: 28.39 |

Example 2

Preparation of the Compound of Formula I-2-1

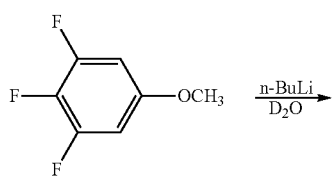

(I-2-1)

Step 1

162 g (1 mol) of 3,4,5-trifluoromethoxybenzene and 600 mL of tetrahydrofuran were added into a flask, stirred to dissolve the solids under $N_2$, cooled to −78° C., then 897 mL of n-butyllithium solution (2.2 mol) was added dropwise in 1 hour. After additional 1 h of stirring, 60 g (3 mol) of heavy water was added dropwise at −78° C. in 1 h. After conventional processing, 158 g colorless liquid (I-2-a) was obtain. its GC purity is 99%, its yield is 95%.

The molar ratio of 3,4,5-trifluoromethoxybenzene:n-butyllithium solution:heavy water is 1:1.8~3:2~10, preferably is 1:2.2:3; reaction temperature is −60~−90° C., preferably is −78° C.

Step 2

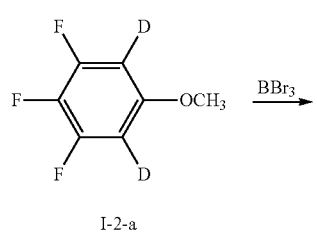

I-2-a

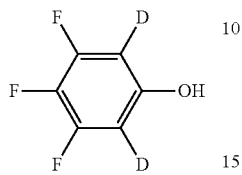

I-2-b

Step 2 of Example 2 is prepared analogously to step 3 of Example 1,

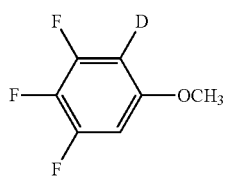

was replaced by

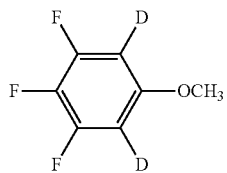

Step 3

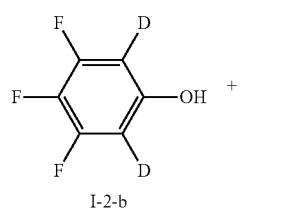

I-2-b

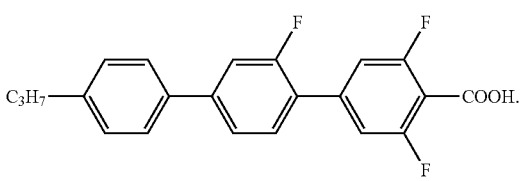

I-2-c

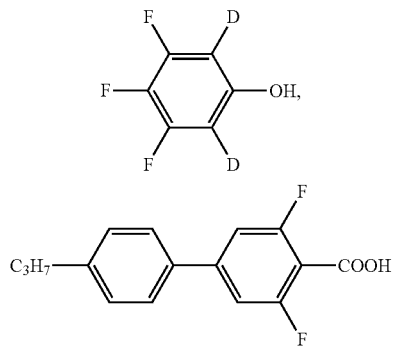

I-2-2

Step 3 of Example 2 is prepared analogously to step 4 of Example 1,

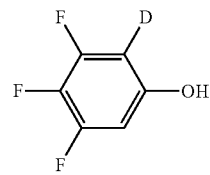

was replaced by was replaced by

MS: m/z (%) 524 (M+, 0.9), 375 (100), 346 (29.4)

$^1$H NMR (300 MHz, CHLOROFORM-D) δ 7.83 (d, J=7.8 Hz, 1H), 7.58 (d, J=7.8 Hz, 1H), 7.02 (d, J=7.8 Hz, 1H), 7.40 (d, J=11.0 Hz, 2H), 7.35 (d, J=11.0 Hz, 2H), 7.22 (d, J=11.0 Hz, 2H), 2.66 (t, J=7.6 Hz, 2H), 1.81-1.58 (m, 2H), 0.99 (td, J=7.3, 2.1 Hz, 3H).

On the basis of the above data, the structure of the obtained product is the expected compound I-2-1 mp 84.6° C.

cp 128.1° C.

Δn [589 nm, 20° C.]: 0.2162

Δε [1 KHz, 20° C.]: 25.97

From the above parameter, I-2-1 have excellent performance as the compounds of structure similar to the same properties of the non-deuterated monomers, Mixed crystal can effectively increase the number of use of such monomers to improve its solubility and low temperature performance.

The compounds shown below can be synthesized by a method similar to that described above using the corresponding reactants.

| Structure | Properties |
|---|---|
| C₃H₇–[Cy]–[Cy]–CF₂O–[Ph(D,F,F,D,F)]–F | Mp: 42.3° C. Cp: 105.7° C. Δn: 0.0739 Δε: 10.28 |
| C₃H₇–[Ph]–[Ph(F,F)]–CF₂O–[Ph(D,F,F,D,F)]–F | Mp: 45.2° C. Cp: 108.9° C. Δn: 0.1270 Δε: 20.09 |
| C₄H₉–[Ph]–[Ph(F,F)]–[Ph(F,F)]–CF₂O–[Ph(D,F,F,D,F)]–F | Mp: 76.5° C. Cp: 117.8° C. Δn: 0.2032 Δε: 23.99 |
| C₅H₁₁–[Ph]–[Ph(F,F)]–[Ph(F,F)]–CF₂O–[Ph(D,F,F,D,F)]–F | Mp: 62.7° C. Cp: 121.9° C. Δn: 0.2229 Δε: 22.37 |
| C₂H₅–[Pyran]–[Ph(F,F)]–[Ph(F,F)]–CF₂O–[Ph(D,F,F,D,F)]–F | Mp: 74.7° C. Cp: 93.9° C. Δn: 0.1567 Δε: 28.41 |
| C₃H₇–[Pyran]–[Ph(F,F)]–[Ph(F,F)]–CF₂O–[Ph(D,F,F,D,F)]–F | Mp: 89.1° C. Cp: 119.5° C. Δn: 0.1562 Δε: 28.48 |

Example 3

Liquid Crystal Mixture O

The mixture O consists of the following compounds in which the compounds have the following mass ratio:

| compound | mass ratio(%) |
|---|---|
| I  C₃H₇–[Ph]–[Ph(F,F)]–CF₂O–[Ph(D,F,F,D,F)]–F | 6 |

-continued

| compound | mass ratio(%) |
|---|---|
| I  C₃H₇–[Cy]–[Cy]–CF₂O–[Ph(D,F,F,F,D)] | 10 |
| I  H₃C–[Cy]–[Cy]–CF₂O–[Ph(D,F,F,F)] | 5 |
| III  C₃H₇–[Cy]–[Cy]–[Ph(F,F,F)] | 13 |
| III  C₃H₇–[Cy]–[Ph]–[Ph(F,F,F)] | 16 |
| III  C₃H₇–[Cy]–[Cy]–[Ph(F)]–[Ph(F,F,F)] | 3 |
| IV  H₃C–[Ph]–[Cy]–[Cy]–CH=CH₂ | 13 |
| IV  C₃H₇–[Cy]–[Cy]–CH=CH₂ | 11 |
| V  C₂H₅–[Cy]–[Ph(F)]–[Ph]–C₃H₇ | 3 |
| VI  C₃H₇–[Cy]–[Cy]–COO–[Ph]–[Cy]–C₃H₇ | 4 |
| VII  C₃H₇–[Ph]–[Ph(F,F)]–CF₂O–[Ph(F,F,F)] | 6 |

-continued

| compound | mass ratio(%) |
|---|---|
| VII  C₃H₇—[Cy]—[Cy]—CF₂O—[Ph(F,F,F)] | 10 |

The physical data of the component O are as follows:
cp: 95° C.;
Δε: 10.5 (20° C., 1000 Hz);
Δn: 0.100 (20° C., 589 nm);
$V_{10}$: 1.43V.
Precipitated crystal temperature: −22° C.

Contrast the Mixture O-2

| compound | mass ratio(%) |
|---|---|
| VII  H₃C—[Cy]—[Cy]—CF₂O—[Ph(F,F,F)] | 5 |
| VII  C₃H₇—[Ph]—[Ph(F,F)]—CF₂O—[Ph(F,F,F)] | 12 |
| VI  C₃H₇—[Cy]—[Cy]—CF₂O—[Ph(F,F,F)] | 20 |
| III  C₃H₇—[Cy]—[Cy]—[Ph(F,F,F)] | 13 |
| III  C₃H₇—[Cy]—[Ph]—[Ph(F,F,F)] | 16 |
| III  C₃H₇—[Cy]—[Cy]—[Ph(F)]—[Ph(F,F,F)] | 3 |
| IV  H₃C—[Ph]—[Cy]—[Cy]—CH=CH₂ | 13 |

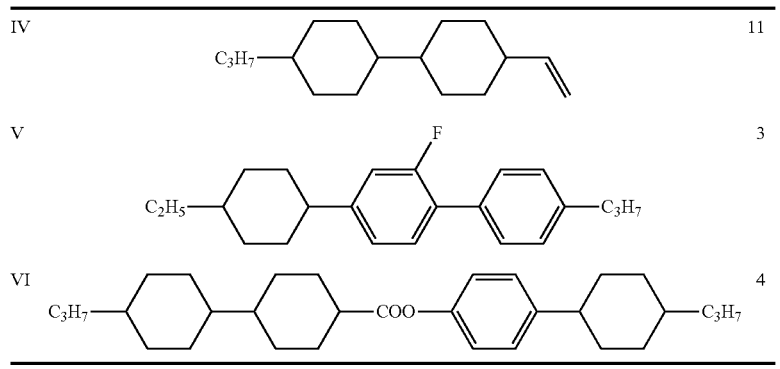

The physical data of the component O-2 are as follows:
cp: 95° C.;
Δ∈: 10.4 (20° C., 1000 Hz);
Δn: 0.099 (20° C., 589 nm);
$V_{10}$: 1.43V.
Precipitated crystal temperature: −14° C.

From the above parameter, the mixture O have excellent performance as the mixture O-2, there is not much change in performance while improving the low solubility of the liquid crystal.

Example 4

Liquid Crystal Mixture P

The mixture P consists of the following compounds in which the compounds have the following mass ratio:

| compound | | mass ratio(%) |
|---|---|---|
| I | [structure] | 8 |
| I | [structure] | 5 |
| III | [structure] | 11 |
| III | [structure] | 18 |
| III | [structure] | 11 |
| III | [structure] | 15 |

-continued

| compound | mass ratio(%) |
|---|---|
| III  C₃H₇–[cyclohexyl]–[cyclohexyl]–[phenyl(3,4,5-triF)] | 2 |
| IV  C₃H₇–[cyclohexyl]–[cyclohexyl]–CH=CH₂ | 6 |
| V  C₂H₅–[cyclohexyl]–[phenyl(2-F)]–[phenyl]–C₃H₇ | 7 |
| VI  C₃H₇–[cyclohexyl]–[cyclohexyl]–COO–[phenyl]–[cyclohexyl]–C₃H₇ | 6 |
| VII  C₃H₇–[phenyl]–[phenyl(3,5-diF)]–CF₂O–[phenyl(3,4,5-triF)] | 7 |
| VII  C₃H₇–[phenyl]–[phenyl(2-F)]–[phenyl(3,5-diF)]–CF₂O–[phenyl(3,4,5-triF)] | 4 |

The physical data of the component P are as follows:
cp: 97° C.;
Δε: 10.5 (20° C., 1000 Hz);
Δn: 0.10 (20° C., 589 nm);
V₁₀: 1.43V.

Example 5

Liquid Crystal Mixture Q

The mixture Q consists of the following compounds in which the compounds have the following mass ratio:

| compound | mass ratio(%) |
|---|---|
| I  C₃H₇–[phenyl]–[phenyl(3,5-diF)]–CF₂O–[phenyl(2-D,3,4,5-triF)] | 5 |
| I  H₃C–[cyclohexyl]–[cyclohexyl]–CF₂O–[phenyl(2,6-diD,3,4,5-triF)] | 5 |

-continued
| | compound | mass ratio(%) |
|---|---|---|
| I | 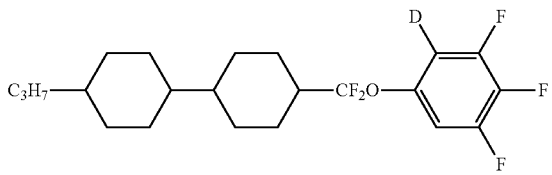 | 8 |
| III | 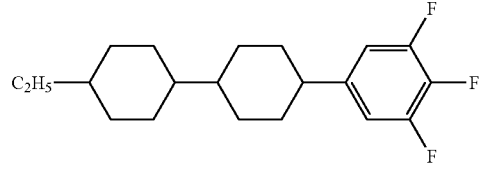 | 8 |
| III | 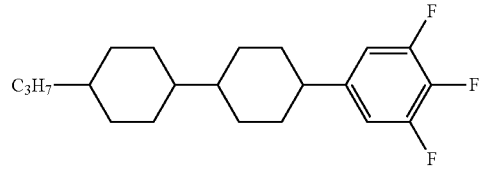 | 9 |
| III | 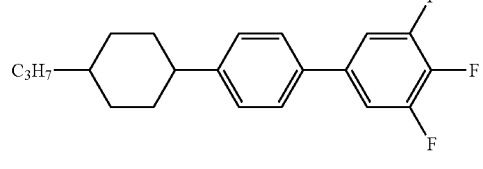 | 10 |
| III | 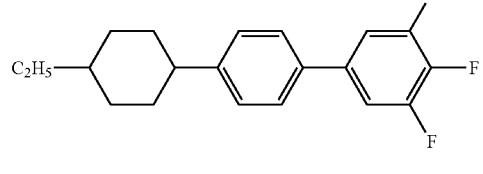 | 6 |
| IV | 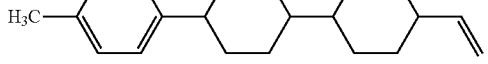 | 4 |
| IV | 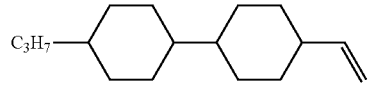 | 17 |
| V | 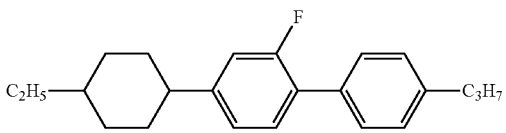 | 7 |
| VI | 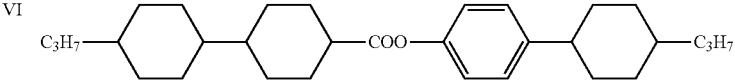 | 5 |
| VI | 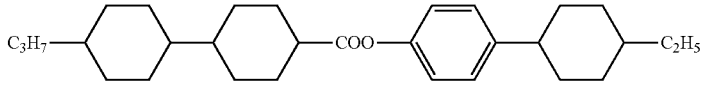 | 4 |

|  | compound | mass ratio(%) |
|---|---|---|
| VII | 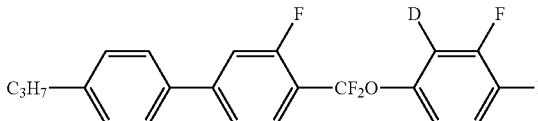 | 5 |
| VII | 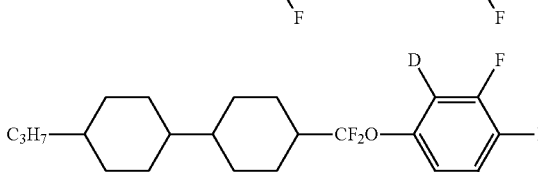 | 7 |
The physical data of the component Q are as follows:
cp: 95° C.;
Δ∈: 11.2 (20° C., 1000 Hz);
Δn: 0.100 (20° C., 589 nm);
$V_{10}$: 1.40V.
Example 6
Liquid Crystal Mixture U
The mixture U consists of the following compounds in which the compounds have the following mass ratio:
|  | compound | mass ratio(%) |
|---|---|---|
| I | 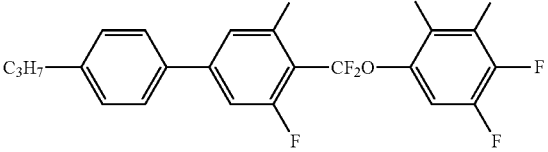 | 6 |
| I | 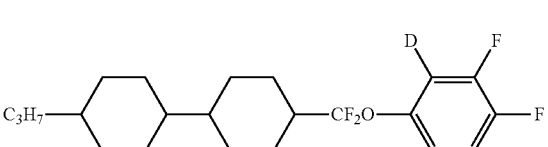 | 10 |
| III | 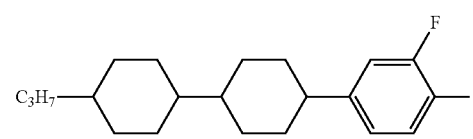 | 12 |
| III | 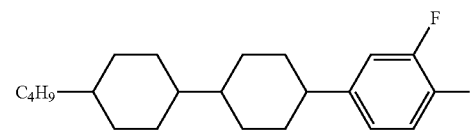 | 7 |
| III | 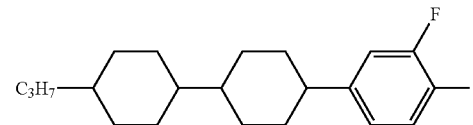 | 6 |

-continued

| | compound | mass ratio(%) |
|---|---|---|
| III | C₃H₇—◯—◯—◯(F,F,F) | 14 |
| IV | H₃C—◯—◯—◯—CH=CH₂ | 7 |
| IV | H₃C—◯—◯—◯—CH₂CH₂CH=CH₂ | 6 |
| IV | C₃H₇—◯—◯—CH=CH₂ | 4 |
| V | C₂H₅—◯—◯(F)—◯—C₃H₇ | 8 |
| VI | C₃H₇—◯—◯—COO—◯—◯—C₂H₅ | 4 |
| VII | C₃H₇—◯—◯(F,F)—CF₂O—◯(F,F,F) | 6 |
| VII | C₃H₇—◯—◯—CF₂O—◯(F,F,F) | 10 |

The physical data of the component U are as follows:
cp: 90° C.;
Δε: 10.4 (20° C., 1000 Hz);
Δn: 0.110 (20° C., 589 nm);
$V_{10}$: 1.50V.

From the above data of example 3-6, the liquid crystal mixtures having large positive dielectric anisotropy (Δε), moderate optical anisotropy (Δn) and driving voltage was expected results. There is not much change in performance while improving the low solubility of the liquid crystal.

INDUSTRIAL APPLICATIONS

This invention provides the liquid crystalline compounds of formula I, which have moderate optical anisotropy (Δn), large positive dielectric anisotropy (Δε), and moderate driving voltage. It is well suited for development of the liquid crystal mixtures. Therefore, it is found that the compounds of formula I and the mixtures comprising compounds of formula I are suitable for a liquid crystal display device, and particularly suitable for liquid crystal display devices, such as TN, STN, IPS, VA modes.

What is claimed is:
1. A liquid-crystalline compound comprising:
a compound of formula I:

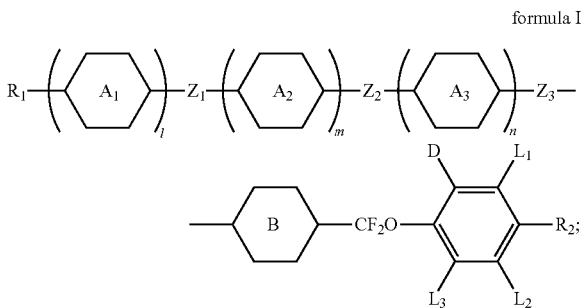

formula I wherein, $R_1$, $R_2$ are selected from the group consisting of H, Cl, F, CN, OCN, $OCF_3$, $CF_3$, $CHF_2$, $CH_2F$, $OCHF_2$, SCN, NCS, $SF_5$ or alkyl having 1 to 15 carbons, fluorinated alkyl having 1 to 15 carbons, chlorinated alkyl having 1 to 15 carbons, deuterated alkyl having 1 to 15 carbons, alkoxy having 1 to 15 carbons, fluorinated alkoxy having 1 to 15 carbons, chlorinated alkoxy having 1 to 15 carbons, deuterated alkoxy having 1 to 15 carbons, alkenyl having 2 to 15 carbons, fluorinated alkenyl having 2 to 15 carbons, chlorinated alkenyl having 2 to 15 carbons, deuterated alkenyl having 2 to 15 carbons, alkenoxy having 1 to 15 carbons, fluorinated alkenoxy having 1 to 15 carbons, chlorinated alkenoxy having 1 to 15 carbons, deuterated alkenoxy having 1 to 15 carbons, cyclopropane, cyclobutane, cyclopentane, cyclohexane, and cycloheptane wherein one or more —$CH_2$— independently of one another are replaced by —CH=CH—, —C≡C—, —COO—, —OOC—, —O— or —S—;

wherein rings $A_1$, $A_2$ and $A_3$ are independently selected from the group consisting of:

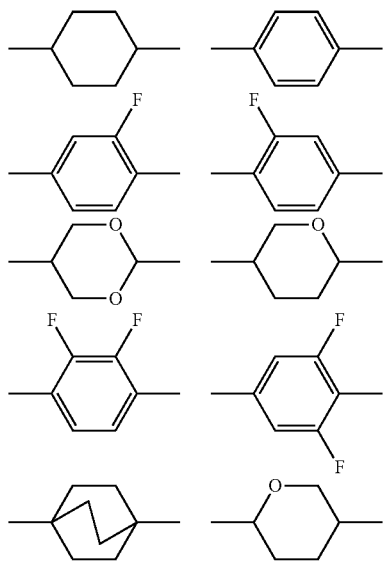

-continued

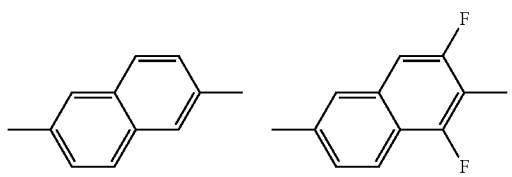

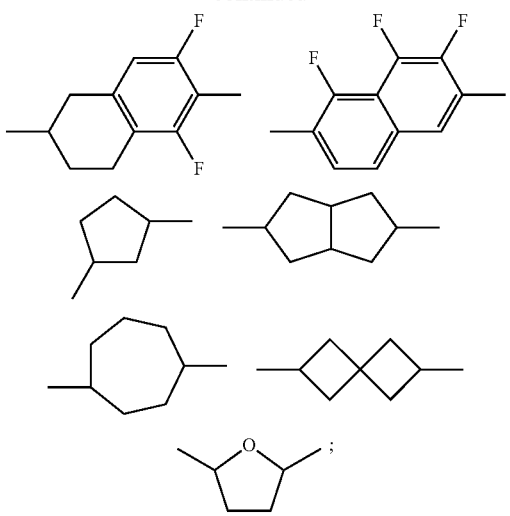

wherein ring B is selected from the group consisting of:

which may be monosubstituted or polysubstituted by fluorine, deuterium, chlorine;

wherein l is 0, 1; m is 0, 1; n is 0, 1;

wherein $Z_1$, $Z_2$ and $Z_3$ are selected from the group consisting of —$CH_2$—, —$CH_2$—$CH_2$—, —$(CH_2)_3$—, —$(CH_2)_4$—, —CH=CH—, —C≡C—, —COO—, —OOC—, —$CF_2O$—, —$OCH_2$—, —$CH_2O$—, —$OCF_2$—, —$CF_2CH_2$—, —$CH_2CF_2$—, —$C_2F_4$—, —CF=CF— and single bond; and wherein $L_1$, $L_2$ and $L_3$ are selected from the group consisting of H, F, Cl and D.

2. The liquid-crystalline compound of claim 1, comprising:

a compound of formula Ia:

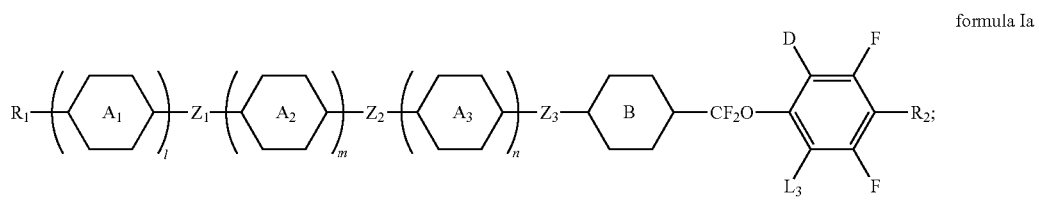

formula Ia wherein, $R_1$ and $R_2$ are selected from the group consisting of F, CN, $OCF_3$, $CF_3$, $CHF_2$, $CH_2F$, $OCHF_2$, NCS, $SF_5$ or alkyl having 1 to 7 carbons, alkoxy having 1 to 7 carbons, alkenyl having 2 to 8 carbons, alkenoxy having 2 to 8 carbons, cyclobutane, cyclopentane, cyclohexane, and cycloheptane;

wherein rings $A_1$, $A_2$ and $A_3$ are independently selected from the group consisting of

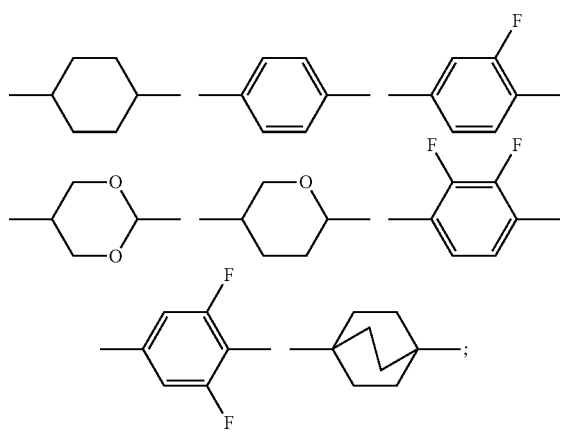

wherein ring B is selected from the group consisting of:

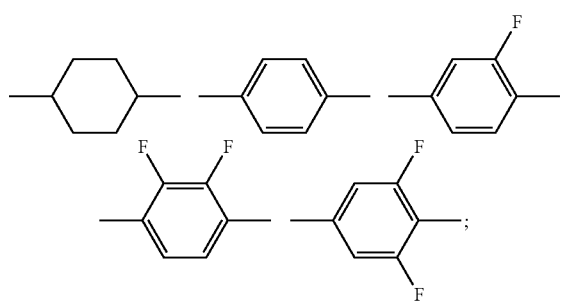

wherein $Z_1$, $Z_2$ and $Z_3$ are selected from the group consisting of —CH$_2$—CH$_2$—, —(CH$_2$)$_4$—, —CH=CH—, —C≡C—, —COO—, —OOC—, —OCH$_2$—, —CH$_2$O—, —OCF$_2$—, —CF$_2$CH$_2$—, —CH$_2$CF$_2$—, —C$_2$F$_4$—, —CF=CF— and single bond;

wherein $L_3$ is selected from the group consisting of H and D; and wherein l is 0, 1; m is 0, 1; n is 0, 1.

3. The liquid-crystalline compound of claim 2 comprising: a compound selected from the group consisting of formula I-1 to I-3

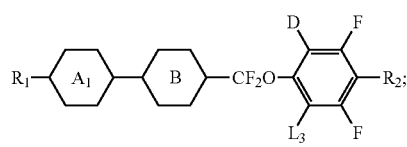

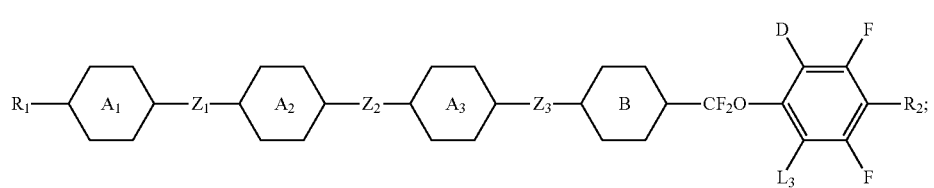

wherein, $R_1$ is selected from the group consisting of alkyl having 1 to 7 carbons, alkoxy having 1 to 7 carbons, alkenyl having 2 to 8 carbons, alkenoxy having 2 to 8 carbons, cyclobutane, cyclopentane, cyclohexane and cycloheptane;

wherein $R_2$ is selected from the group consisting of F, CN, OCF$_3$, CF$_3$, CHF$_2$, CH$_2$F, OCHF$_2$, NCS, SF$_5$ or alkyl having 1 to 7 carbons, alkoxy having 1 to 7 carbons, alkenyl having 2 to 8 carbons, alkenoxy having 2 to 8 carbons, cyclobutane, cyclopentane, cyclohexane, and cycloheptane;

wherein rings $A_1$, $A_2$ and $A_3$ are independently selected from the group consisting of:

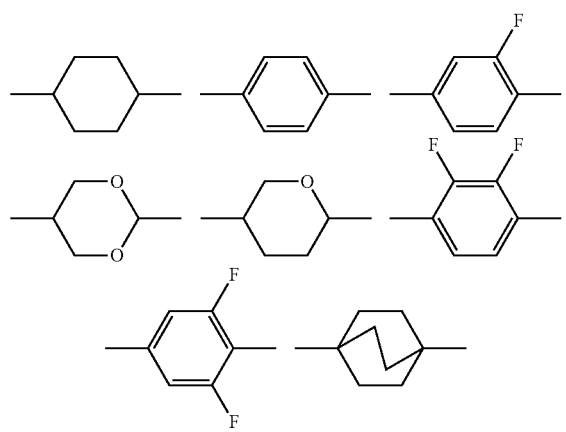

wherein ring B is selected from the group consisting of:

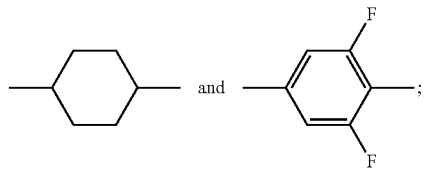

wherein $Z_1$, $Z_2$ and $Z_3$ are selected from the group consisting of —CH$_2$—CH$_2$—, —(CH$_2$)$_4$—, —CH=CH—, —C≡C—, —COO—, —OOC—, —OCH$_2$—, —CH$_2$O—, —OCF$_2$—, —CF$_2$CH$_2$—, —CH$_2$CF$_2$—, —C$_2$F$_4$—, —CF=CF— and single bond;

wherein L₃ is selected from the group consisting of H and D.

4. A liquid-crystal mixture comprising component a, wherein said component a comprises at least one compound of formula I according to claim 1.

5. The liquid crystal mixture according to claim 4, wherein the mass ratio of component a is 1~80% in the liquid crystal mixture.

6. The liquid-crystal mixture according to claim 4, further comprising component b, component c, component d, component e and component f;
wherein component b comprises one or more compounds selected from the following formula III;
wherein component c comprises one or more compounds selected from the following formula IV and the mass ratio of component c is 1~70%,
wherein component d comprises one or more compounds selected from the following formula V, and the mass ratio of component d is 1~30%,
wherein component e comprises one or more compounds selected from the following formula VI, and the mass ratio of component e is 1~30%,
wherein component f comprises one or more compounds selected from the following formula VII and the mass ratio of component f is 1~50%,

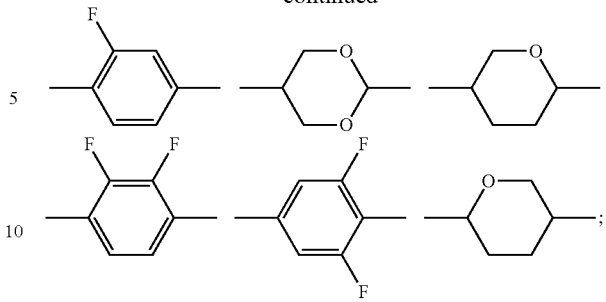

wherein ring B is selected from the group consisting of:

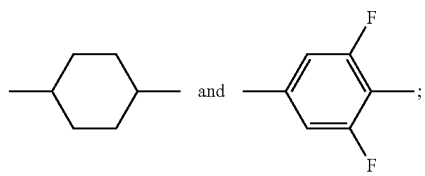

III

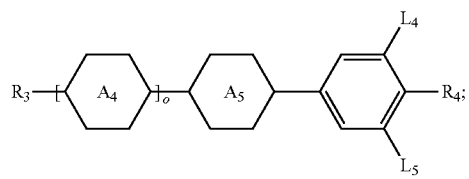

IV

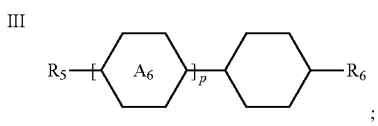

V

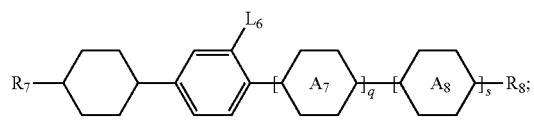

VI

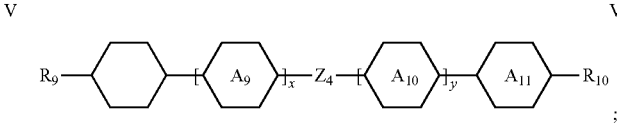

VII

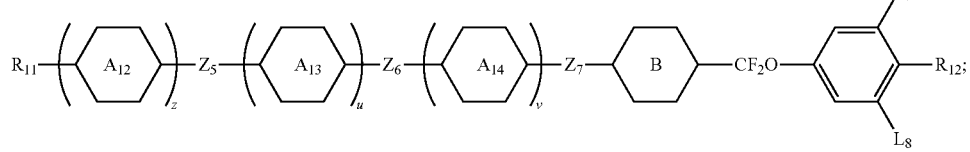

wherein in Formula III to VII, $R_3$-$R_{12}$ are selected from the group consisting of F, CN, $OCF_3$, $CF_3$, $CHF_2$, $CH_2F$, $OCHF_2$, NCS, $SF_5$ or alkyl having 1 to 7 carbons, alkoxy having 1 to 7 carbons, alkenyl having 2 to 8 carbons, alkenoxy having 2 to 8 carbons, cyclobutane, cyclopentane, cyclohexane, and cycloheptane;

wherein rings $A_4$-$A_{14}$ are independently selected from the group consisting of:

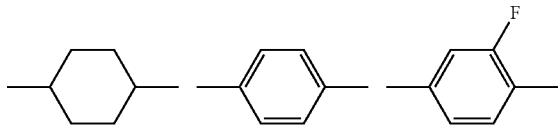

wherein $Z_4$-$Z_7$ are selected from the group consisting of —$CH_2$—$CH_2$—, —$(CH_2)_4$—, —CH=CH—, —C≡C—, —COO—, —OOC—, —$OCH_2$—, —$CH_2O$—, —$OCF_2$—, —$CF_2CH_2$—, —$CH_2CF_2$—, —$C_2F_4$—, —CF=CF— and single bond;
wherein $L_4$-$L_8$ are selected from the group consisting of H, F, Cl and CN; and
wherein o, p, q, s, x, y, z, u and v are selected from the group consisting of 0, 1 and 2.

7. The liquid crystal mixture according to claim 6, wherein the mass ratio of component b, component c, component d, component e and component f is 1~70: 1~70: 1~30: 1~30: 1~50 in the liquid crystal mixture.

8. The liquid crystal mixture according to claim 6, consisting of component a-f, wherein the mass ratio of component a, component b, component c, component d, component e and component f is 1~80: 1~70: 1~70: 1~30: 1~30: 1~50 in the liquid crystal mixtures.

9. An electro-optical liquid crystal display device containing a liquid crystal mixture according to claim 4.

10. The electro-optical liquid crystal display device according to claim 9, wherein display modes of the device are TN, STN, IPS or VA.

11. The liquid crystal mixture according to claim 5, wherein the mass ratio of component a is 13~21% in the liquid crystal mixture.

12. The liquid-crystal mixture according to claim 6, wherein the mass ratio of component b is 32~57%,
wherein the mass ratio of component c is 6~24%,
wherein the mass ratio of component d is 3~8%,
wherein the mass ratio of component e is 4~9%, and
wherein the mass ratio of component f is 11~16%.

13. The liquid crystal mixture according to claim 7, wherein the mass ratio of component b, component c, component d, component e and component f are 32~57: 6~24: 3~8: 4~9: 11~16 in the liquid crystal mixture.

14. The liquid crystal mixture according to claim 8, wherein the mass ratio of component a, component b, component c, component d, component e and component f is 13~21: 32~57: 6~24: 3~8: 4~9: 11~16.

15. The liquid crystal mixture of claim 6, wherein the one or more compounds of component b are selected from the group consisting of formula III-1 to III-13:

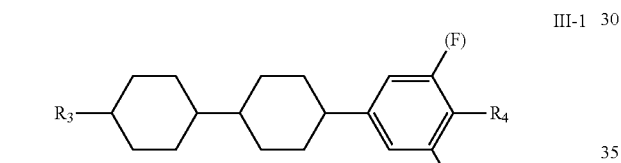
III-1

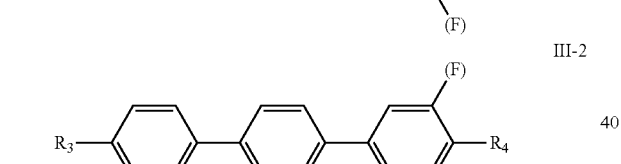
III-2

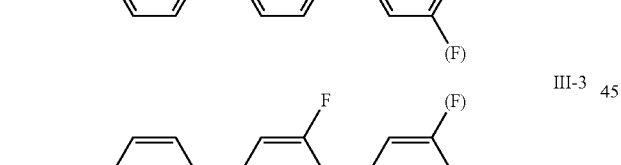
III-3

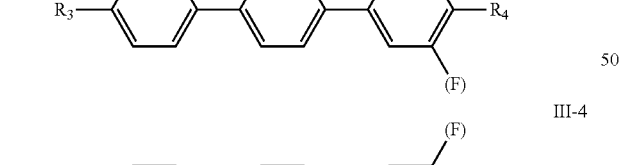
III-4

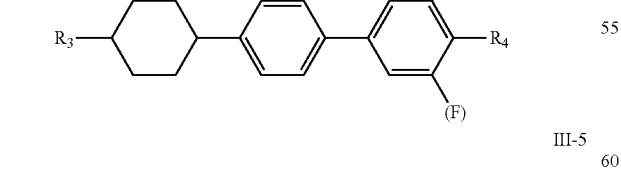
III-5

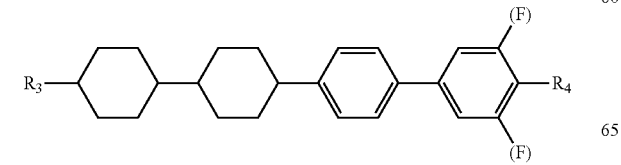

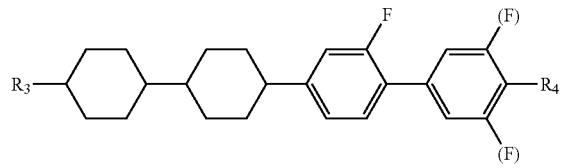
III-6

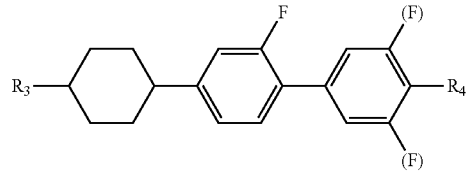
III-7

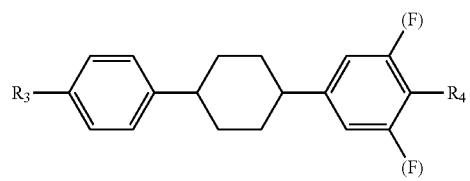
III-8

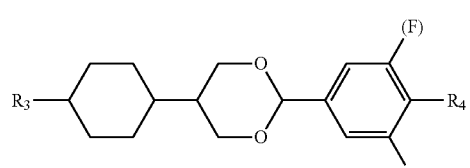
III-9

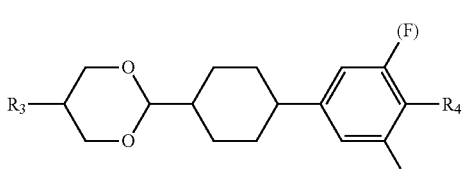
III-10

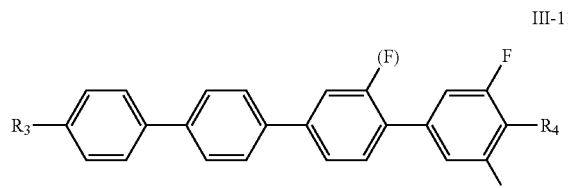
III-11

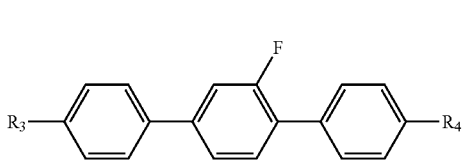
III-12

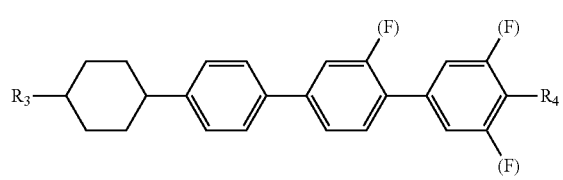
III-13 wherein (F) is selected from the group consisting of —F and —H.

16. The liquid crystal mixture of claim 6, wherein the one or more compounds of component c are selected from the group consisting of formula IV-1 to IV-10:

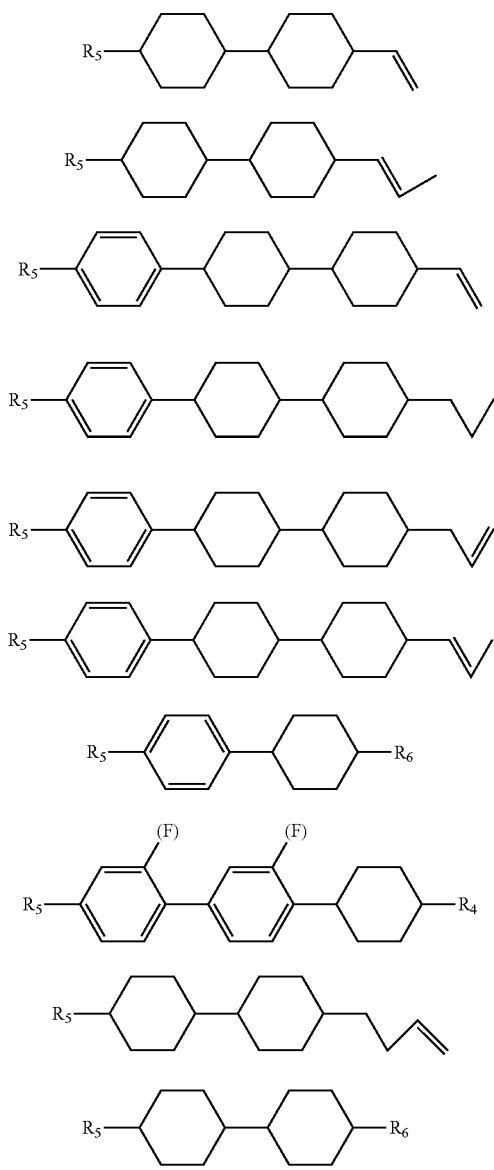

wherein —(F) is selected from the group consisting of —F and —H.

17. The liquid crystal mixture of claim 6, wherein the one or more compounds of component d are selected from the group consisting of formula V-1 to V-3:

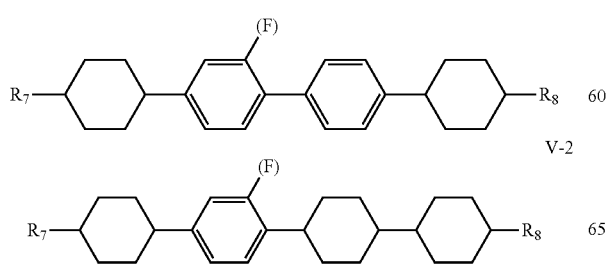

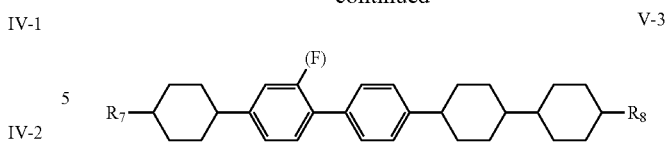

wherein —(F) is selected from the group consisting of —F and —H.

18. The liquid crystal mixture of claim 6, wherein the one or more compounds of component e are selected from the group consisting of formula VI-1 to VI-17:

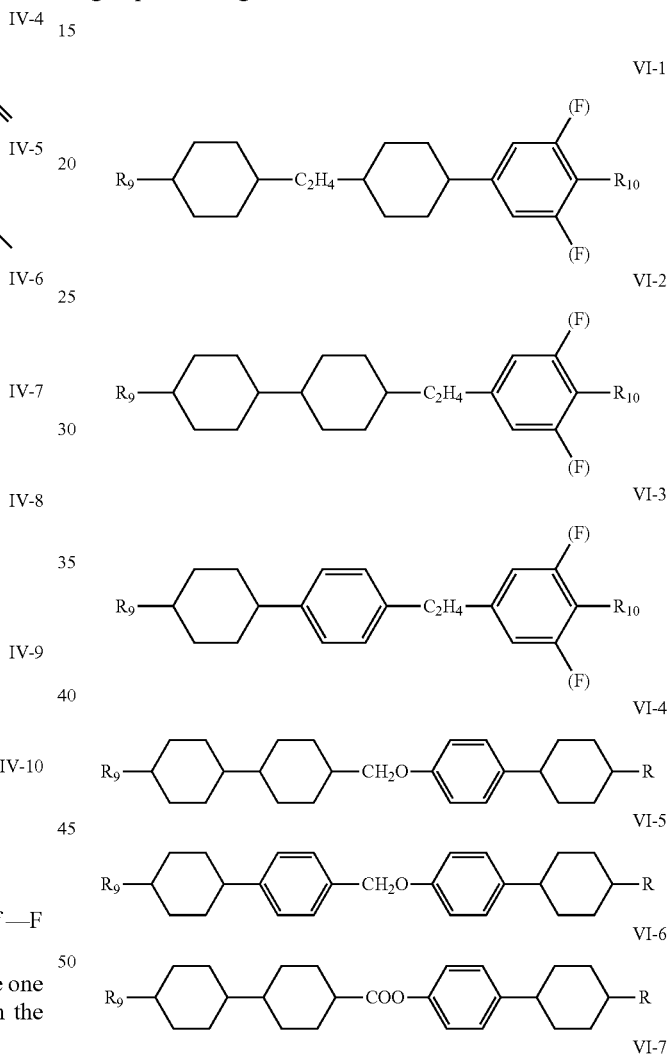

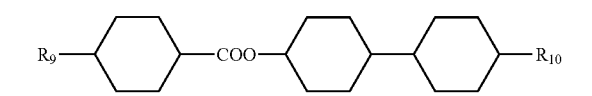

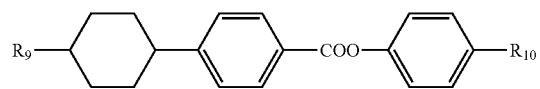
VI-10
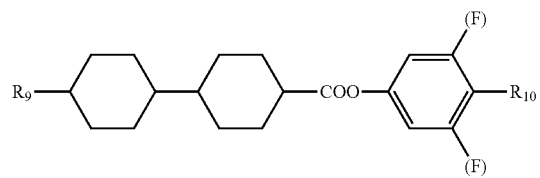
VI-11
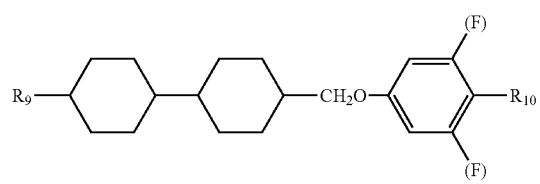
VI-12
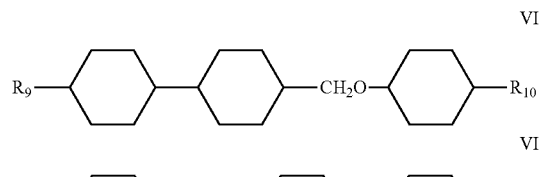
VI-13
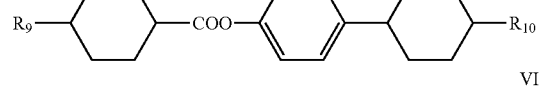
VI-14
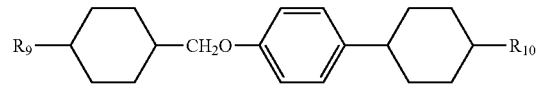
VI-15
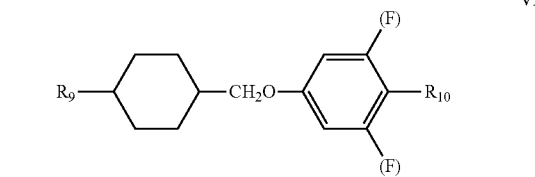
VI-16
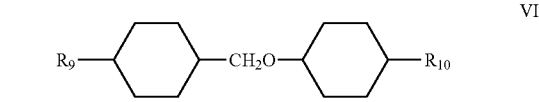
VI-17
wherein —(F) is selected from the group consisting of —F and —H.
19. The liquid crystal mixture of claim 6, wherein the one or more compounds of component f are selected from the group consisting of formula VII-1 to VII-8:
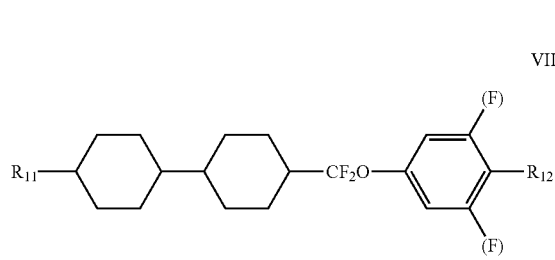
VII-1
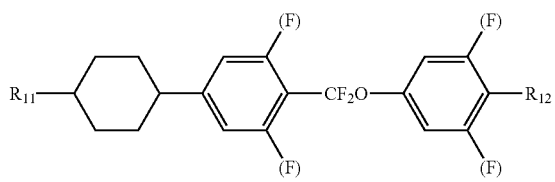
VII-2
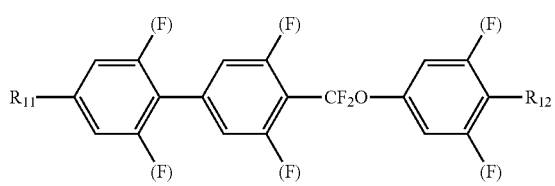
VII-3
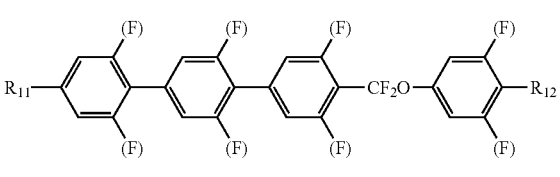
VII-4
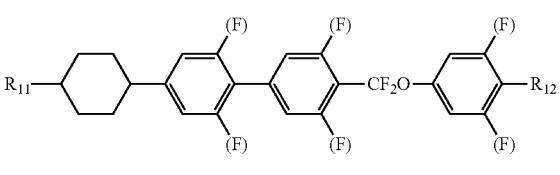
VII-5
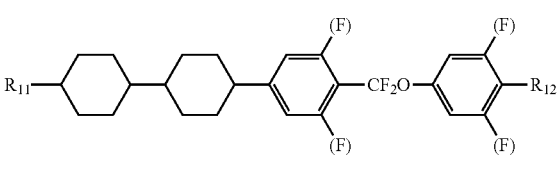
VII-6
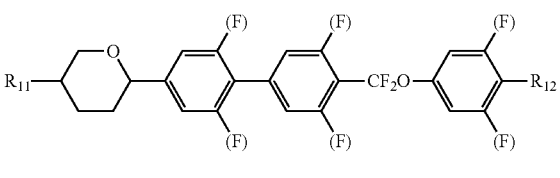
VII-7
VII-8
wherein —(F) is selected from the group consisting of —F and —H.

20. A method for producing the Liquid crystal compound of claim 1 comprising,
  a) synthesizing the compound by the following scheme:
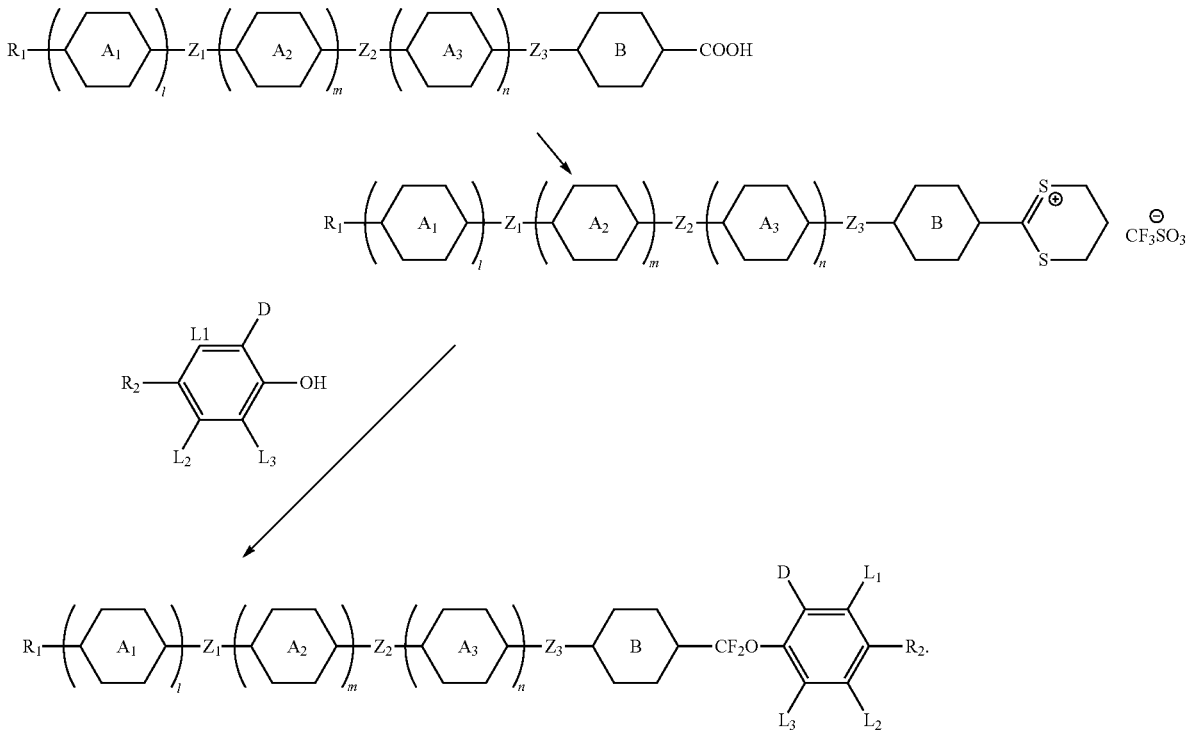
* * * * *